US012677190B2

(12) United States Patent
Bergström et al.

(10) Patent No.: US 12,677,190 B2
(45) Date of Patent: Jul. 7, 2026

(54) HANDLING COMMUNICATION IN A WIRELESS COMMUNICATION NETWORK

(71) Applicant: Telefonaktiebolaget LM Ericsson (publ), Stockholm (SE)

(72) Inventors: Mattias Bergström, Sollentuna (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

(21) Appl. No.: 18/702,905

(22) PCT Filed: Oct. 14, 2022

(86) PCT No.: PCT/SE2022/050932
§ 371 (c)(1),
(2) Date: Apr. 19, 2024

(87) PCT Pub. No.: WO2023/068986
PCT Pub. Date: Apr. 27, 2023

(65) Prior Publication Data
US 2024/0414589 A1      Dec. 12, 2024

Related U.S. Application Data

(60) Provisional application No. 63/262,809, filed on Oct. 21, 2021.

(51) Int. Cl.
*H04W 28/02* (2009.01)

(52) U.S. Cl.
CPC ............................... *H04W 28/0278* (2013.01)

(58) Field of Classification Search
CPC .................................................. H04W 28/0278
(Continued)

(56) References Cited

U.S. PATENT DOCUMENTS 11,419,002 B2 * 8/2022 Lee ................... H04W 28/0278
2018/0368023 A1 12/2018 Hong et al.
2019/0053260 A1 * 2/2019 Shaheen ............. H04W 72/569

FOREIGN PATENT DOCUMENTS

EP          2420029 A1      2/2012
EP          3863325 B1 *    3/2023    .......... H04W 72/569
(Continued)

OTHER PUBLICATIONS

3GPP, "3GPP TS 38.300 V16.7.0", 3rd Generation Partnership Project; Technical Specification Group Radio Access Network; NR; NR and NG-RAN Overall Description; Stage 2 (Release 16), Sep. 2021, 1-152.

(Continued)

*Primary Examiner* — Adil Ocak
(74) *Attorney, Agent, or Firm* — Murphy, Bilak & Homiller, PLLC

(57) ABSTRACT

A first network node is configured for handling communication in a wireless communications network. Based on logical channel information configured at the first network node, the first network node determines a version of a buffer status report to use. For example, the version of the buffer status report to use may be determined from among multiple buffer status report versions, where two or more of the multiple buffer status report versions each support multiple logical channel groups, LCGs, e.g., a first version that supports up to 8 LCGs and a second version that supports up to 256 LCGs. Regardless, the first network node transmits the buffer status report of this determined version to a second network node.

21 Claims, 17 Drawing Sheets

(58) Field of Classification Search
USPC .......................................................... 709/238
See application file for complete search history.

(56)                    References Cited

FOREIGN PATENT DOCUMENTS

WO          2016114700  A1      7/2016
WO          2020132284  A1      6/2020

OTHER PUBLICATIONS

3GPP, "3GPP TS 38.321 V16.10.0", 3rd Generation Partnership Project; Technical Specification Group Radio Access Network; NR; Medium Access Control (MAC) protocol specification (Release 16), Sep. 2022, 1-159.
3GPP, "3GPP TS 38.331 V16.10.0", 3rd Generation Partnership Project; Technical Specification Group Radio Access Network; NR; Radio Resource Control (RRC) protocol specification (Release 16), Sep. 2022, 1-971.
3GPP, "3rd Generation Partnership Project; Technical Specification Group Radio Access Network; NR; Medium Access Control (MAC) protocol specification (Release 16)", 3GPP TS 38.321 V16.6.0, Sep. 2021, 1-158.
3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, 1-133.
3GPP, "3rd Generation Partnership Project; Technical Specification Group Radio Access Network; NR; Radio Resource Control (RRC) protocol specification (Release 16)", 3GPP TS 38.331 V16.6.0, Sep. 2021, 1-961.
3GPP, "3rd Generation Partnership Project; Technical Specification Group Radio Access Network; NR; Study on Integrated Access and Backhaul; (Release 16)", 3GPP TR 38.874 V16.0.0, Dec. 2018, 1-111.
3GPP, "3rd Generation Partnership Project; Technical Specification Group Radio Access Network; Study on Integrated Access and Backhaul; (Release 15)", 3GPP TR 38.874 0.7.0, Nov. 2018, 1-111.
Unknown, Author, "New WID: Integrated Access and Backhaul for NR", 3GPP TSG RAN Meeting #82 RP-182882, Sorrento, Italy, Dec. 10-13, 2018, 1-7.

* cited by examiner

901. Determine version

902. Transmit BSR of determined version

Start

End

| Oct 1 | Oct 2 | | Oct 32 | Oct 33 | Oct 34 | | Oct m+32 |
|---|---|---|---|---|---|---|---|
| $LCG_0$ | $LCG_8$ | | $LCG_{248}$ | | | | |
| $LCG_1$ | $LCG_9$ | | $LCG_{249}$ | | | | |
| $LCG_2$ | $LCG_{10}$ | | $LCG_{250}$ | | | | |
| $LCG_3$ | $LCG_{11}$ | | $LCG_{251}$ | Buffer Size 1 | Buffer Size 2 | | Buffer Size m |
| $LCG_4$ | $LCG_{12}$ | ... | $LCG_{252}$ | | | ... | |
| $LCG_5$ | $LCG_{13}$ | | $LCG_{253}$ | | | | |
| $LCG_6$ | $LCG_{14}$ | | $LCG_{254}$ | | | | |
| $LCG_7$ | $LCG_{15}$ | | $LCG_{255}$ | | | | |

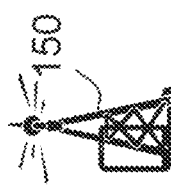
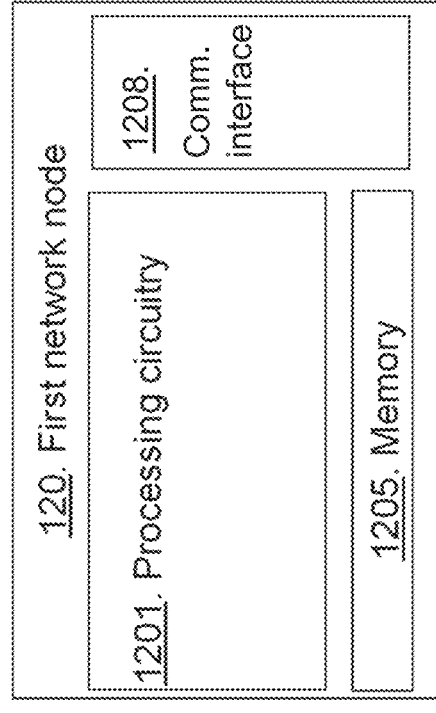
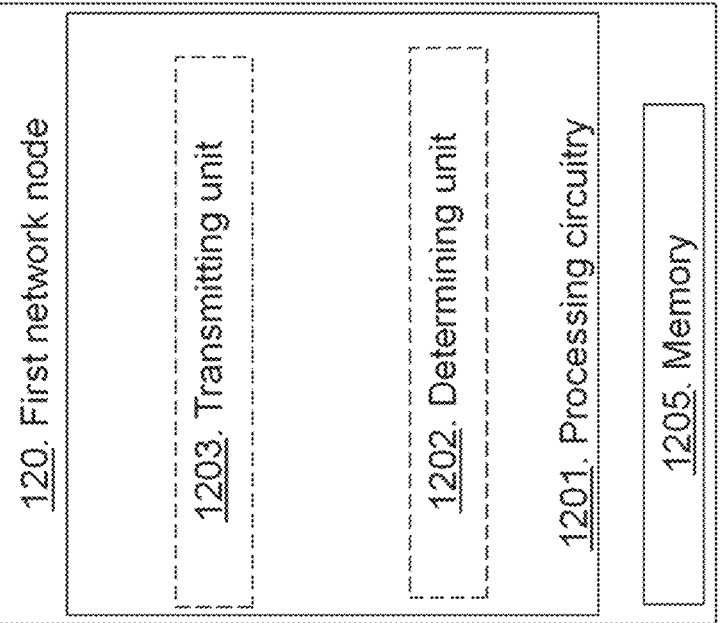
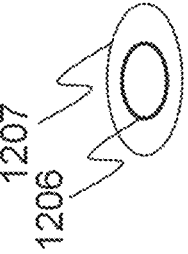
FIG. 12

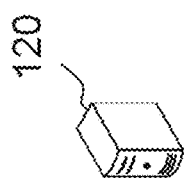
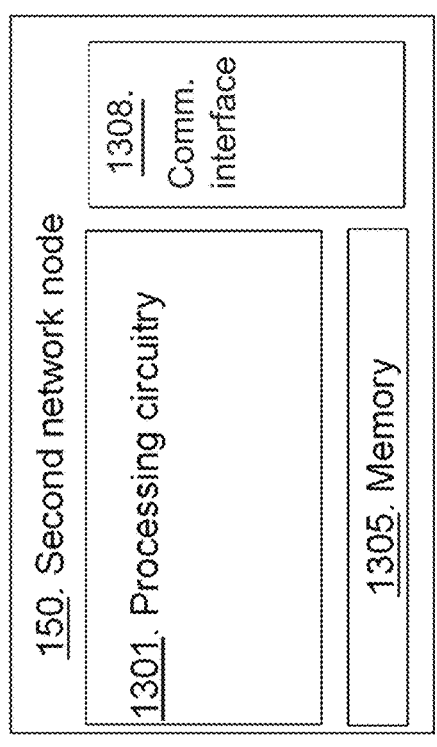
150. Second network node
1301. Processing circuitry
1308. Comm. interface
1305. Memory
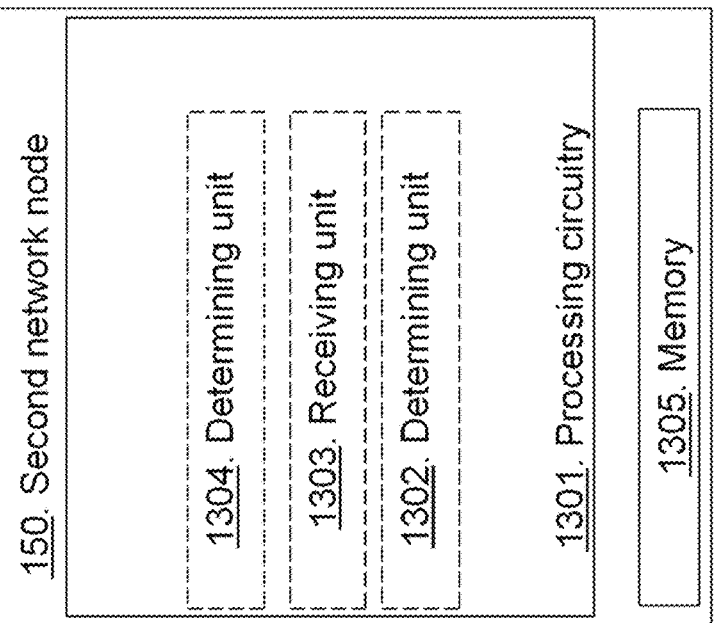
150. Second network node
1304. Determining unit
1303. Receiving unit
1302. Determining unit
1301. Processing circuitry
1305. Memory
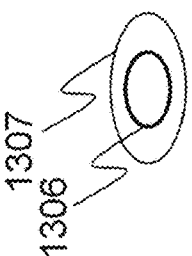
1307
1306
FIG. 13

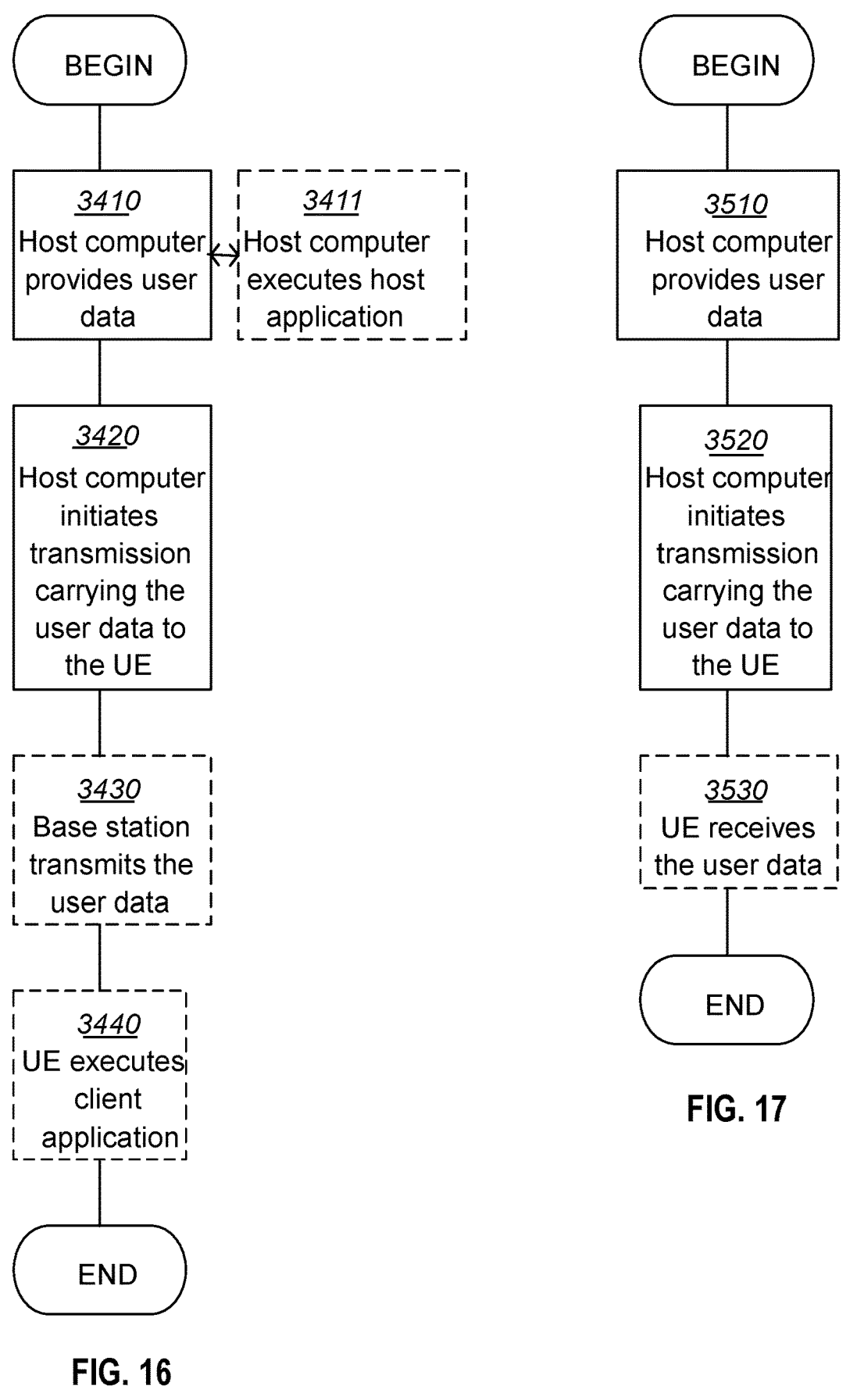

BEGIN

*3410*
Host computer provides user data

*3411*
Host computer executes host application

*3420*
Host computer initiates transmission carrying the user data to the UE

*3430*
Base station transmits the user data

*3440*
UE executes client application

END

FIG. 16

BEGIN

*3510*
Host computer provides user data

*3520*
Host computer initiates transmission carrying the user data to the UE

*3530*
UE receives the user data

END

FIG. 17

HANDLING COMMUNICATION IN A WIRELESS COMMUNICATION NETWORK

TECHNICAL FIELD

Embodiments herein relate to a first network node, a second network node, and methods performed therein regarding wireless communication. Furthermore, a computer program product and a computer-readable storage medium are also provided herein. In particular, embodiments herein relate to handling communication in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE, and the UE communicates over an uplink (UL) to the radio network node.

The usage of short range mmWave spectrum in New Radio (NR) creates a need for a densified deployment with multi-hop backhauling. However, optical fiber to every base station will be too costly and sometimes not even possible, for example, due to historical sites. Integrated Access Backhaul (IAB) employs the use of wireless links for the backhaul, instead of fiber, to enable flexible and very dense deployment of cells without the need for densifying the transport network. See, e.g., 3$^{rd}$ Generation Partnership Project (3GPP) document RP-182882. Use case scenarios for IAB may include coverage extension, deployment of massive number of small cells and fixed wireless access (FWA), e.g. to residential/office buildings. The larger bandwidth available for NR in mmWave spectrum provides an opportunity for self-backhauling, without limiting the spectrum to be used for the access links. On top of that, the inherent multi-beam and multiple input multiple output (MIMO) support in NR reduces cross-link interference between backhaul and access links, allowing higher densification.

In the context of IAB there are two kinds of nodes that are identified as components of a RAN: an IAB-node and an IAB-donor. An IAB-node is a RAN node that supports wireless access to UEs and wirelessly backhauls the access traffic. An IAB-donor is an IAB node which provides UE's interface to core network and wireless backhauling functionality to IAB nodes.

IAB can leverage the Central Unit (CU)/Distributed Unit (DU) split architecture of NR, where the IAB node will be hosting a DU part that is controlled by a central unit. See, e.g., 3GPP Technical Report (TR) 38.874 v0.7.0. The DU part of the IAB node is in charge of receiving data in the UL from the child IAB nodes, and transmitting in the DL to the child IAB node. The IAB nodes also have a Mobile Termination (MT) part in the IAB node that they use to communicate with their parent nodes, i.e., to transmit in the UL to the parent node and to receive in the DL from the parent node. Hence, an IAB node is made up of a DU part and of an MT part.

The specifications for IAB strive to reuse existing functions and interfaces defined in NR. In particular, MT, gNB-DU, gNB-CU, user plane function (UPF), access and mobility management function (AMF) and session management function (SMF), as well as the corresponding interfaces NR Uu, between MT and gNB, F1, NG, X2 and N4, are used as baseline for the IAB architectures. Modifications or enhancements to these functions and interfaces for the support of IAB will be explained in the context of the architecture discussion. Additional functionality, such as multi-hop forwarding, is included in the architecture discussion as it is necessary for the understanding of IAB operation and since certain aspects may require standardization.

The MT function has been defined as a component of the IAB node. In the context of this disclosure, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor and multiple IAB-nodes. The IAB-donor may be treated as a single logical node that comprises a set of functions such as gNB-DU, gNB-CU-control plane (CP), gNB-CU-user plane (UP), and potentially other functions. In a deployment, the IAB-donor can be split according to these functions, which can all be either collocated or non-collocated, as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks. Thus, FIG. 1 shows a high-level architectural view of an IAB network such as a Reference diagram for IAB-architectures (TR 38.874 v0.7.0).

The baseline user plane and control plane protocol stacks for IAB are shown in FIGS. 2 and 3.

FIG. 2 shows a Baseline User Plane (UP) Protocol stack for IAB in release (rel)-16.

FIG. 3 shows a Baseline control plane (CP) Protocol stack for IAB in rel-16.

As shown, the chosen protocol stacks reuse the current CU-DU split specification in rel-15, where the full user plane F1-U (GTP-U/UDP/IP) is terminated at the IAB node, like a normal DU, and the full control plane F1-C (F1-AP/SCTP/IP) is also terminated at the IAB node, like a normal DU. In the above cases, Network Domain Security (NDS) has been employed to protect both UP and CP traffic, IPsec in the case of UP, and datagram transport layer security (DTLS) in the case of CP. IPsec could also be used for the CP protection instead of DTLS; in this case no DTLS layer would be used.

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul radio link control (RLC) channel, and also between ingress and egress backhaul RLC channels in intermediate IAB nodes, to satisfy the end to end quality of service (QoS) requirements of bearers.

BAP Entities

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows one example of the functional view of the BAP sublayer. This functional view should not restrict implementation. FIG. 4 is based on the radio interface protocol architecture defined in TS 38.300 v.16.1.0. In the example of FIG. 4, the receiving part on the BAP entity delivers BAP Protocol data units (PDU) to the transmitting part on the collocated BAP entity. Alternatively, the receiving part may deliver BAP service data units (SDU) to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

BSR Reporting in IAB

The BSR reporting in IAB is the same as in legacy Uu communications. That is because the BSR transmission is handled by the MT part of the IAB node that in this case behaves like an ordinary UE. Hence, also the BSR format used by the IAB node is the same as the one adopted by UEs and depicted in the following Figs for the short and long BSR respectively. FIG. 5 shows a Short BSR and Short Truncated BSR Medium Access Control (MAC) Control Element (CE). FIG. 6 shows a Long BSR, Long Truncated BSR, and Pre-emptive BSR MAC CE.

For the IAB node, the logical channel group (LCG) configuration is provided via RRC and included as part of the BH RLC channel configuration, i.e. in the BH-RLC-ChannelConfig IE. That is a difference compared to ordinary UEs in which the LCGs are configured as part of the RLC bearer configuration, i.e. in the RLC-BearerConfig. This difference is due to the fact that an IAB node handles BH RLC channels rather than RLC channels. Hence, in the IAB framework the network can group within the same LCG various BH RLC channels, each of them represented by a specific BH logical channel identity in the BH-RLC-ChannelConfig IE. This is represented in 3GPP TS 38.331 v16.6.0.

Each LCG associated to an integer value between 0 and 7, as per the LogicalChannelConfig IE, is then represented in a buffer status report (BSR) MAC control element (CE) format illustrated in FIG. 6, i.e., the configured LCG0 is represented in the bit $LCG_0$ of the BSR MAC CE, the configured LCG0 is represented in the bit $LCG_1$, and so on.

It is worthwhile noting that the same format described above is also adopted for the pre-emptive BSR transmission. The pre-emptive BSR is used by a child IAB node to early advertise its parent on the imminent arrival of UL data that will be transmitted by its own child. For example, a child IAB node may generate a pre-emptive BSR upon reception of an SR or of a BSR from one of its children. The pre-emptive BSR may be used by the parent to reserve scheduling resources and to reduce scheduling delays.

In Rel.17, 3GPP has decided to extend the LCGs used in the BSR by an IAB node. In Rel.16 IAB operations, the amount of BH RLC logical channels that can be configured to an IAB node is much larger than the amount of logical channels that can be configured to a UE. However, the number of configurable LCGs is still the same, i.e. maximum 8 LCGs. This implies that in case the network needs to configure many BH RLC channels, e.g. due to the very diverse traffic characteristics to be served by an IAB node, many of such BH RLC channels needs to be grouped in the same LCG. In order to have a finer mapping between BH RLC channels and LCG, and hence in order to increase the system fairness, 3GPP decided in to extend the LCG space to 256 LCGs in Rel.17.

MAC Control Elements

In NR, the gNB and the UE use so called Medium Access (MAC) Control Elements (CE) to exchange information such as buffer status reports, power headroom reports and others. A comprehensive list of MAC CEs is provided in section 6.1.3 of 3GPP TS 38.321 v16.6.0.

Each MAC CE is identified by a logical channel ID (LCID) which is used as an identifier for the MAC CE so that the receiver is interpreting the MAC CE correctly. Since the number of introduced MAC CEs has become large, extended LCIDs (eLCIDs) can also be used to represent one MAC CE.

SUMMARY

The 3GPP specification supports up to 256 logical channel groups for IAB nodes. The BSR MAC CE for IAB nodes would therefore need to indicate up to 256 different logical channel groups, whereas in the current legacy BSR MAC CE format only up to 8 LCGs, i.e. one octet, can be used. To indicate that many logical channel groups, 32 octets are necessary. However, it is expected that in most of the cases, the network does not need to configure all of the 256 LCGs, and in practice the number of needed LCGs will be much smaller. If an IAB node is configured with only a few logical channel groups but has to include 32 octets anyway, that results in a lot of unnecessary overhead.

An object herein is to provide a mechanism to enable communication, e.g. handle or manage signalling, in an efficient manner in a wireless communications network.

According to an aspect, the object is achieved by providing a method performed by a first network node, such as an IAB node, for handling or managing signalling or communication in a wireless communications network. The first network node determines a version of a buffer status report (BSR) to use based on logical channel information configured at the first network node. For example, the version selected may be based on the highest number of LCG indices configured at the first network node, or based on a number of LCG indices configured at the first network node. The first network node transmits, to a second network node, the BSR of the determined version.

According to another aspect, the object is achieved by providing a method performed by a second network node, such as an IAB node, for handling or managing communication and/or control signalling in a wireless communications network. The second network node determines a version of a buffer status report (BSR) based on logical channel information configured at the second network node. The second network node receives, from a first network node. a BSR of the determined version.

It is furthermore provided herein a computer program product comprising instructions, which, when executed on at least one processor, cause the at least one processor to carry out the methods above, as performed by the first and the second network nodes, respectively. It is additionally provided herein a computer-readable storage medium, having stored thereon a computer program product comprising instructions which, when executed on at least one processor, cause the at least one processor to carry out the methods above, as performed by the first, the second, and the third network nodes, respectively.

The object is achieved by providing a first network node, a second network node, and a third network node configured to perform the methods herein, respectively.

According to yet another aspect, the object is achieved by providing a first network node, such as an IAB node, for handling or managing signalling or communication in a wireless communications network. The first network node is configured to determine a version of a buffer status report (BSR) to use based on logical channel information configured at the first network node. For example, the version selected may be based on the highest number of LCG indices configured at the first network node, or based on a number of LCG indices configured at the first network node. The first network node is further configured to transmit, to a second network node, the BSR of the determined version.

According to another aspect, the object is achieved by providing a second network node, such as an IAB node, for handling or managing communication and/or control signalling in a wireless communications network. The second network node determines a version of a buffer status report based on logical channel information configured at the second network node. The second network node receives, from a first network node, a BSR of the determined version.

Embodiments herein allow efficient signalling of BSR and disclose a MAC CE design for a long BSR MAC CE for IAB scenarios which provides the necessary information without causing unnecessary signalling overhead. This is achieved by defining different versions of MAC CEs, where the different versions support different numbers of LCGs and the transmitter (when it transmits BSR) and receiver (when it receives/decodes BSR) selects which version of the MAC CE to apply based on the indices of the configured LCGs. The methods described herein for the long BSR MAC CE are equally applicable for the case of preemptive BSR MAC CE. Thus, embodiments herein provide efficient signalling and a solution that is a backward compatible way of extending the support for the number of carriers in the MAC specification.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 11a shows a BSR MAC CE according to embodiments herein;

FIG. 11b shows a BSR MAC CE according to embodiments herein;

FIG. 12 is a block diagram depicting first network nodes according to embodiments herein;

FIG. 13 is a block diagram depicting second network nodes according to embodiments herein;

FIG. 16 illustrates methods implemented in a communication system including a host computer, a base station, and a user equipment in accordance with some embodiments;

FIG. 17 illustrates methods implemented in a communication system including a host computer, a base station, and a user equipment in accordance with some embodiments;

DETAILED DESCRIPTION

Figure 7:
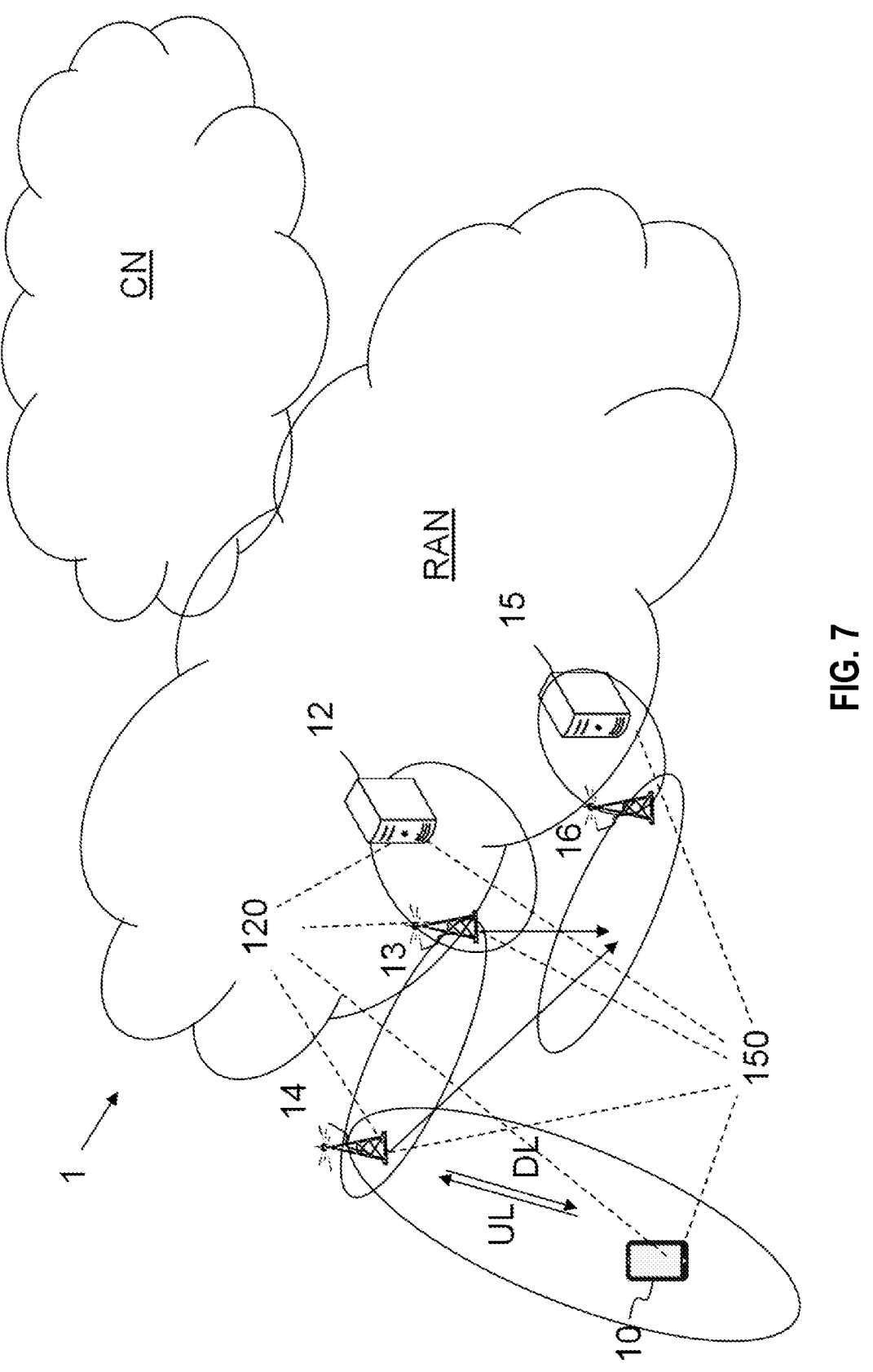
FIG. 7 is a schematic overview depicting a wireless communications network according to embodiments herein.

Embodiments herein relate to wireless communications networks in general. FIG. 7 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context However, embodiments are also applicable in further developments of existing wireless communications systems such as e.g. Long Term Evolution (LTE) or Wideband Code Division Multiple Access (WCDMA).

In the wireless communications network 1, a user equipment (UE) 10, such as a mobile station, a wireless device, a non-access point (non-AP) station (STA), a STA, and/or a wireless terminal, is communicating via, e.g. one or more Access Networks (AN), e.g. RAN, to one or more core networks (CN). It should be understood by the skilled in the art that "UE" is a non-limiting term which means any terminal, wireless communications terminal, user equipment, Narrowband Internet of Things (NB-IoT) device, Machine Type Communication (MTC) device, Device to Device (D2D) terminal, or node, e.g. smart phone, laptop, mobile phone, sensor, relay, mobile tablet or even a small base station capable of communicating using radio communication with a radio network node within an area served by the radio network node.

The wireless communications network 1 comprises a first radio network node 12 e.g. an IAB node such as an IAB-donor node or an IAB-CU, baseband unit (BBU), an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), Mobility Management Entity (MME), Access and Mobility Function (AMF), a stand-alone access point, or any other network unit or node capable of communicating with a wireless device within a service area served by the radio network node depending e.g. on a first radio access technology and terminology used. The first radio network node 12 may also be referred to as a serving or source node or RAN node. It should be noted that a service area may be denoted as cell, beam, beam group or similar to define an area of radio coverage.

The wireless communication network 1 further comprises a first intermediate radio network node 13 connected in-between the first radio network node 12 and the UE 10. The first intermediate radio network node 13 may be an IAB node e.g. a radio remote unit (RRU), an access node, antenna unit, radio unit of, e.g., a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point, or any other network unit or node capable of communicating with a wireless device within a service area served by the radio network node depending e.g. on a first radio access technology and terminology used.

The wireless communication network further comprises a second intermediate radio network node 14 connected in-between the first radio network node 12 and the UE 10. The second intermediate radio network node 14 may be connected to the UE 10 directly and may be an egress point. The second intermediate radio network node 14 may be an IAB node, e.g. a radio remote unit (RRU), an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point, or any other network unit or node capable of communicating with a wireless device within a service area served by the radio network node depending e.g. on a radio access technology and terminology used. It should be noted that a service area may be denoted as a cell, beam, beam group or similar, to define an area of radio coverage.

Furthermore, the wireless communications network 1 comprises a second radio network node 15, e.g. an IAB node such as an IAB-donor node or an IAB-CU, a baseband unit (BBU), an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point, or any other network unit or node capable of communicating with a wireless device within a service area served by the radio network node depending e.g. on a radio access technology and terminology used. The second radio network node 15 may be referred to as a target node or RAN node. It should be noted that a service area may be denoted a as cell, beam, beam group or similar, to define an area of radio coverage.

The wireless communication network 1 may further comprise a third intermediate radio network node 16 connected in-between the second radio network node 15 and served UEs. The third intermediate radio network node 16 may be an IAB node, e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point, or any other network unit or node capable of communicating with a wireless device within a service area served by the radio network node depending e.g. on a radio access technology and terminology used. It should be noted that a service area may be denoted as a cell, beam, beam group or similar, to define an area of radio coverage.

Embodiments herein relate to sending buffer status reports (BSRs) between network nodes such as transmitting a BSR from a first network node 120 to a second network node 150. The first network node 120 may be any network node such as the UE 10, the first intermediate radio network node, 13, the second intermediate radio network node 14, or the first radio network node 12. The second network node 150 may be any network node such as the first intermediate radio network node 13, the second intermediate radio network node 14, the first radio network node 12, or the second radio network node 15.

Embodiments herein disclose determination of a BSR version to use from the first network node 120 to the second network node 150.

BSR or BSR MAC CEs may be defined in different versions, where the different versions support different numbers of LCGs or different intervals of LCGs. For example, in some embodiments, different versions of a BSR MAC CE will be defined:

one version which supports up to 7 or 8 LCGs
one version which supports up to 15 or 16 LCGs
one version which supports up to 23 or 24 LCGs
one version which supports up to 31 or 32 LCGs
one version which supports up to 255 or 256 LCGs The different versions of the MAC CEs may have the same logical channel ID (LCID) or extended LCID (eLCID), or the different versions of the MAC CEs may have different LCIDs or eLCIDs.

In the below sections it will be described how the transmitter, i.e., the first network node 120, will select which version of the BSR MAC CE to send.

Note that even though it is stated that the BSR MAC CEs are to be sent between two network nodes in an IAB scenario, it should be appreciated that it can also be sent between any types of nodes in the network, e.g. between a UE and or some other network node, or between two UEs in case of device-to-device communication. But for simplicity and readability it will sometimes be used as an example that it is two network nodes in an IAB scenario that send these MAC CEs between themselves.

Figure 8:
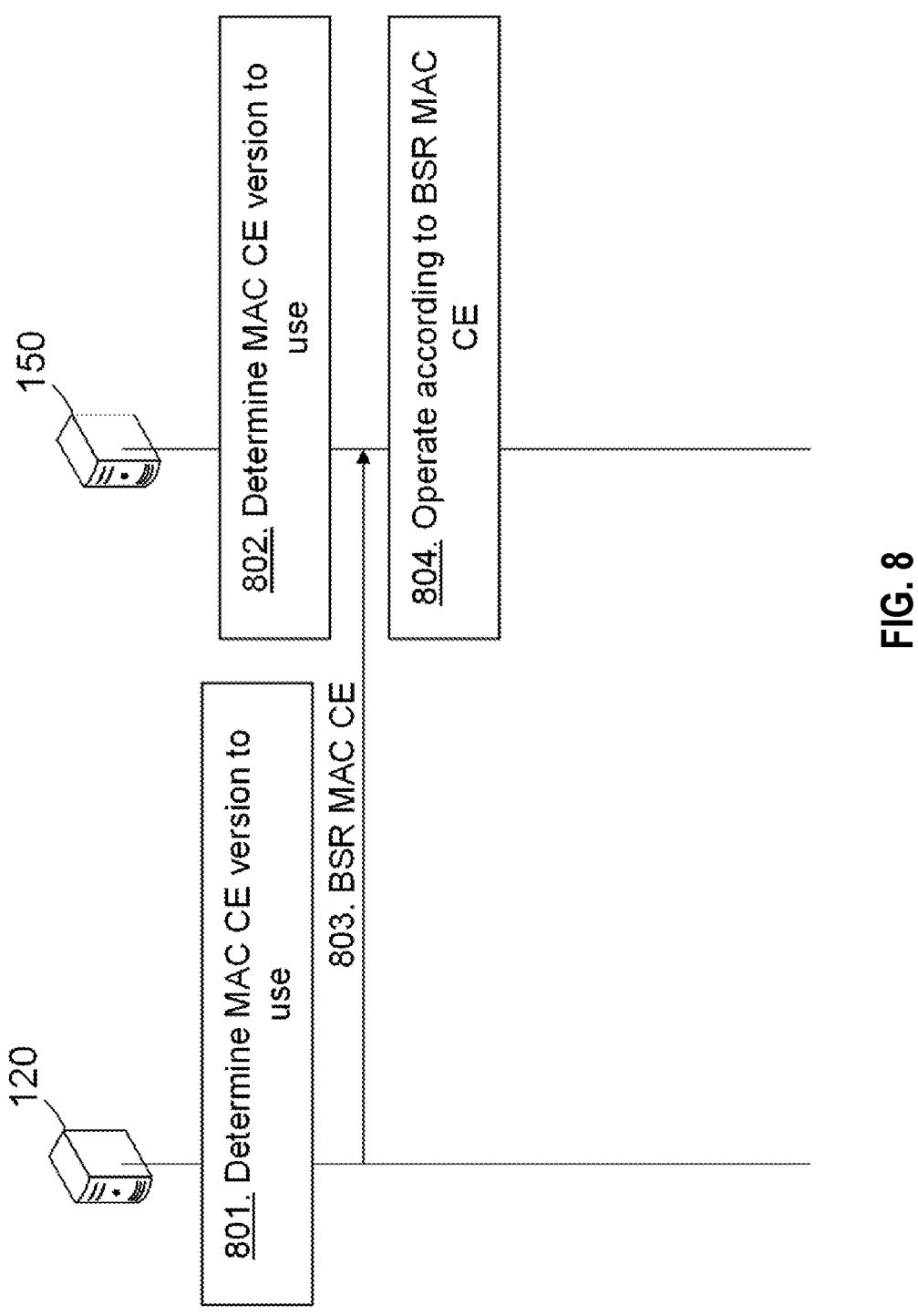
FIG. 8 is a combined signalling scheme and flowchart according to some embodiments herein.

FIG. 8 is a combined signalling scheme and flowchart depicting some embodiments herein.

Action 801. The first network node 120 determines a version of a BSR, out of a number of versions of BSRs, to use based on logical channel information configured at the first network node 120. The logical channel information in some embodiments refers to information that is configured at the first network node 120 and that is about logical channels or logical channel groups at the first network node 120, e.g., in the sense that the information governs which or how many logical channels or logical channel groups are configured and/or to be used at the first network node 120. In one or more embodiments, for example, the logical channel information relates to logical channel groups (LCGs), or LCG indices, configured at the first network node 120. In one such embodiment, the logical channel information comprises a highest LCG index configured at the first network node 120.

Note that such configuration of the logical channel information at the first network node 120 may be according to a configuration received by the first network node 120, e.g., via radio resource control (RRC) signaling. The configuration in these and other embodiments may be semi-static in nature.

Note further that logical channel information configured at the first network node 120 is distinguishable from information about data availability at the first network node 120. For example, logical channel information configured at the first network node 12 is distinguishable from information about how many logical channel groups have data available for transmission. Indeed, such relates to dynamic availability of data at the first network node 120 as opposed to information configured at the first network node 120 about logical channels or logical channel groups at the first network node 120.

In some embodiments, the different versions of BSR support different number of LCGs. For example, the version used is based on the number of LCGs and/or indices of LCGs configured at the first network node 120. For example, the BSR MAC CE version to apply may be determined based on the index of the LCG with the highest index which the first network node 120 is configured with.

This selection mechanism can be generalized so that multiple levels are used:

if the highest configured LCG ID is 1 to $N_1$, a first MAC CE version is applied if the highest configured LCG ID is $N_1+1$ to $N_2$, a second MAC CE version is applied if the highest configured LCG ID is $N_2+1$ to $N_3$, a third MAC CE version is applied

. . .

if the highest configured LCG ID is $N_{n-1}+1$ to $N_n$, an $n^{th}$ MAC CE version is applied As this example demonstrates, then, in some embodiments, the version of the BSR to use is may be determined from among multiple BSR versions, where two or more of the multiple BSR versions each support multiple logical channel groups (LCGs). In one embodiment, for instance, the two or more of the multiple BSR versions have different respective numbers of octets for indicating LCG indices.

Action 802. Similarly, the second network node 150 determines the version of a BSR, out of the number of versions of BSRs, to use based on logical channel information configured at the second network node 150. In all the methods presented in the following, both the transmitting and receiving node, e.g., child node and parent node respectively, is aware of which LCGs and LCG indices are configured, and hence there is no need for explicit coordination (e.g., signalling) between the transmitting and receiving nodes on which BSR version should be used.

Action 803. The first network node 120 transmits to the second network node 150, a BSR of the determined version.

Action 804. The second network node 150 receives BSR of the determined version and reads the BSR and operates taking the information into account e.g. granting transmission.

Figure 9:
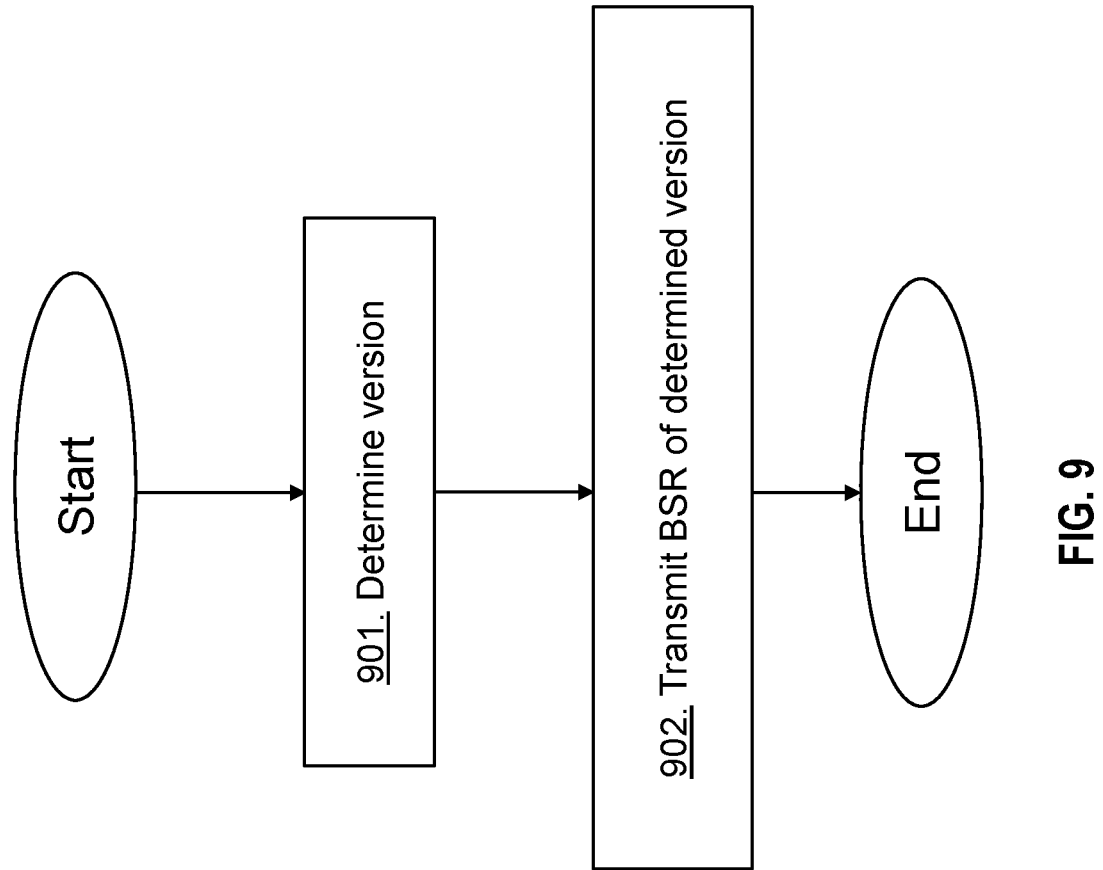
FIG. 9 is a schematic flowchart depicting a method performed by a first network node according to embodiments herein.

The method actions performed by the first network node 120 for handling communication in the wireless communications network 1 according to embodiments herein will now be described with reference to a flowchart depicted in FIG. 9.

Action 901. The first network node 120 determines a version of the buffer status report (e.g., a version of a BSR MAC CE) to use based on logical channel information configured at the first network node 120. Logical channel information may relate to LCGs configured at the first network node 120.

In some embodiments, versions may be defined by the number of octets used. For example, the version of the BSR may comprise a number of octets, wherein the number of octets indicating the LCG indices depends on a configured LCG with a highest index.

Alternatively, or additionally, the version of BSR may comprise a bitmap, wherein each bit of the bitmap is associated to a configured LCG. Thus, the number of octets of the BSR may be based on the number of LCG indices configured at the first network node 120.

Action 902. The first network node 120 transmits the BSR of the determined version to the second network node 150.

Figure 10:
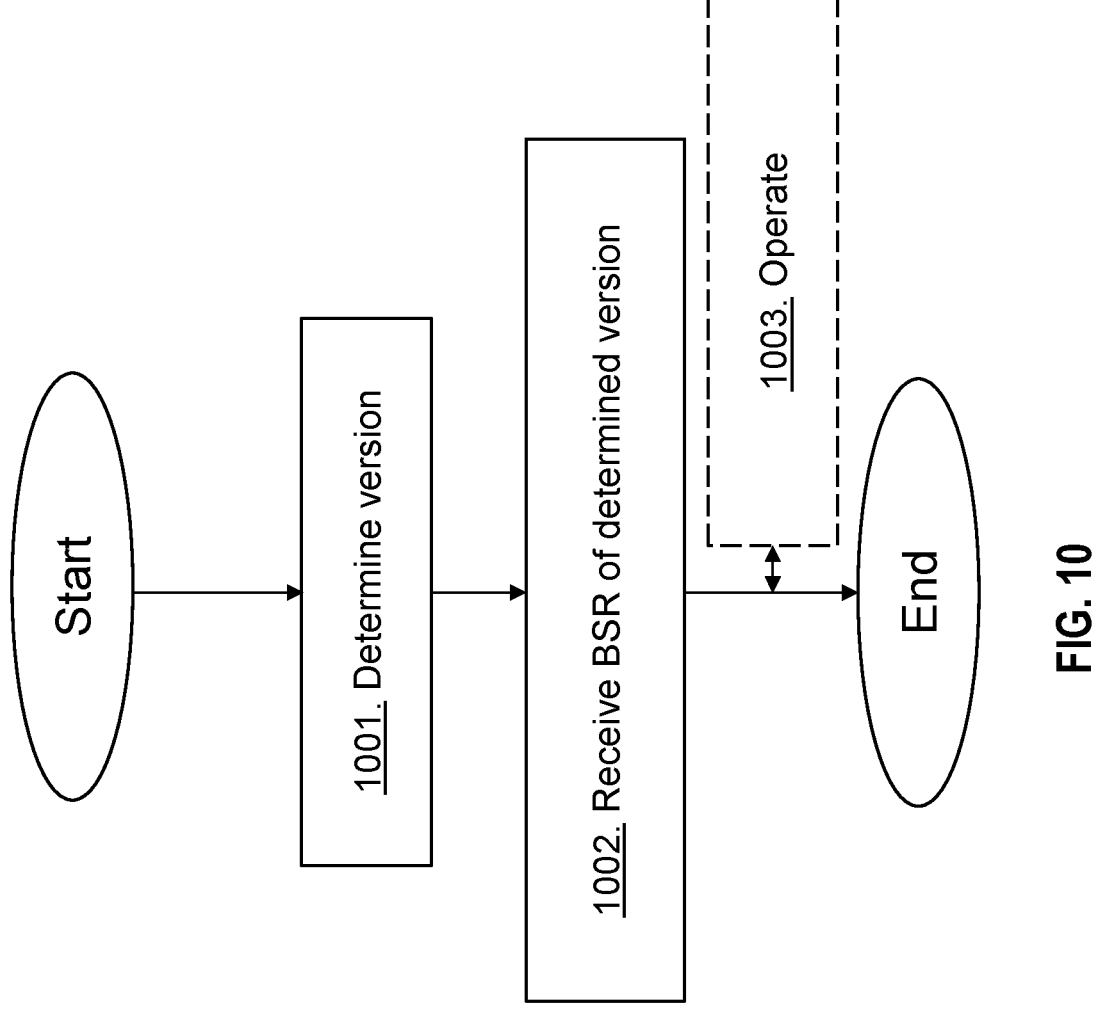
FIG. 10 is a schematic flowchart depicting a method performed by a second network node according to embodiments herein.

The method actions performed by the second network node 150 for handling communication in the wireless communications network 1 according to embodiments herein will now be described with reference to a flowchart depicted in FIG. 10. The wireless communications network 1 may comprise the first network node 120 and the second network node 150 and one or more nodes relaying data packets between a central network node and a UE.

Action 1001. The second network node 150 determines the version of the buffer status report (e.g., a version of a BSR MAC CE) based on logical channel information configured at the second network node 150. Logical channel information may relate to LCGs configured at the second network node 150.

In some embodiments, versions of the BSR may be defined by the number of octets used. For example, the version of the BSR may comprise a number of octets, wherein the number of octets indicating the LCG indices depends on a configured LCG with a highest index. Alternatively, the version of BSR may comprise a bitmap, wherein each bit of the bitmap is associated to a configured LCG or LCG index. Thus, the number of octets of the BSR may be based on the number of LCG indices configured at the second network node 150.

Action 1002. The second network node 150 receives the BSR of the determined version from the first network node 120.

Action 1003. The second network node 150 may then operate taking information of the BSR into account.

First Method—BSR MAC CE with Number of Octets Depending on the Configured LCG with Highest Index In a particular embodiment, if all LCGs the first network node 120 is configured with have an index lower than or equal to 8, then a first version of the MAC CE is applied. If all LCGs the first network node 120 is configured with have an index lower than or equal to 16, then a second version of the MAC CE is applied. If all LCGs the first network node 120 is configured with have an index lower than or equal to 24, then a third version of the MAC CE is applied. And so on.

Hence another way of describing the above embodiment is that the applied MAC CE version has a certain number of octets, wherein the number of octets including the LCGs depends on the configured LCG with the highest index.

Specifically, if the configured LCG with the highest index is transmitted in the octet Y, then all the octets X with X<Y are included in the transmitted BSR MAC CE.

Consider, as an example of this embodiment, the BSR MAC CE with 256 possible LCGs depicted in the FIG. 11*a*. The methods above imply that the first network node 120 includes in the BSR MAC CE the octet 1 if any LCG is configured, the octet 2 only if at least one LCG above LCG7 is configured, the octet 3 only if at least one LCG above LCG15 is configured, and so on, until octet 32 that is included only if at least one LCG above LCG247 is configured. Therefore, in this embodiment, all the octets including the LCG bits, up to the octet including the configured LCG with the highest index, are included. As a result, it is noted that some of the octets that are included may contain bits associated to LCGs that are not configured at the first network node 120. For example, if the first network node 120 is an IAB node, and the IAB node is configured with only LCG16, the IAB node will include besides octet 3 (which includes the LCG16), also octet 1 and 2 even though the IAB node has no LCG within the range LCG0-LCG15.

Second Method—Flexible BSR MAC CE with Number of Octets Depending on the Configured LCGs In a second method, the BSR MAC CE consists of a bitmap, where each bit is associated to a configured LCG. In this method, each bit in the octets that provide the bitmap is therefore associated to a configured LCG, apart from the last octet that may contain some bits not associated to any configured LCG. Specifically, in this method, the bit X in the bitmap is associated to the LCG configuration with the $X^{th}$ smallest index, and it is included only if it either represents a configured LCG or it is included in the last octet containing at least one bit associated to a configured LCG.

Figure 11B:
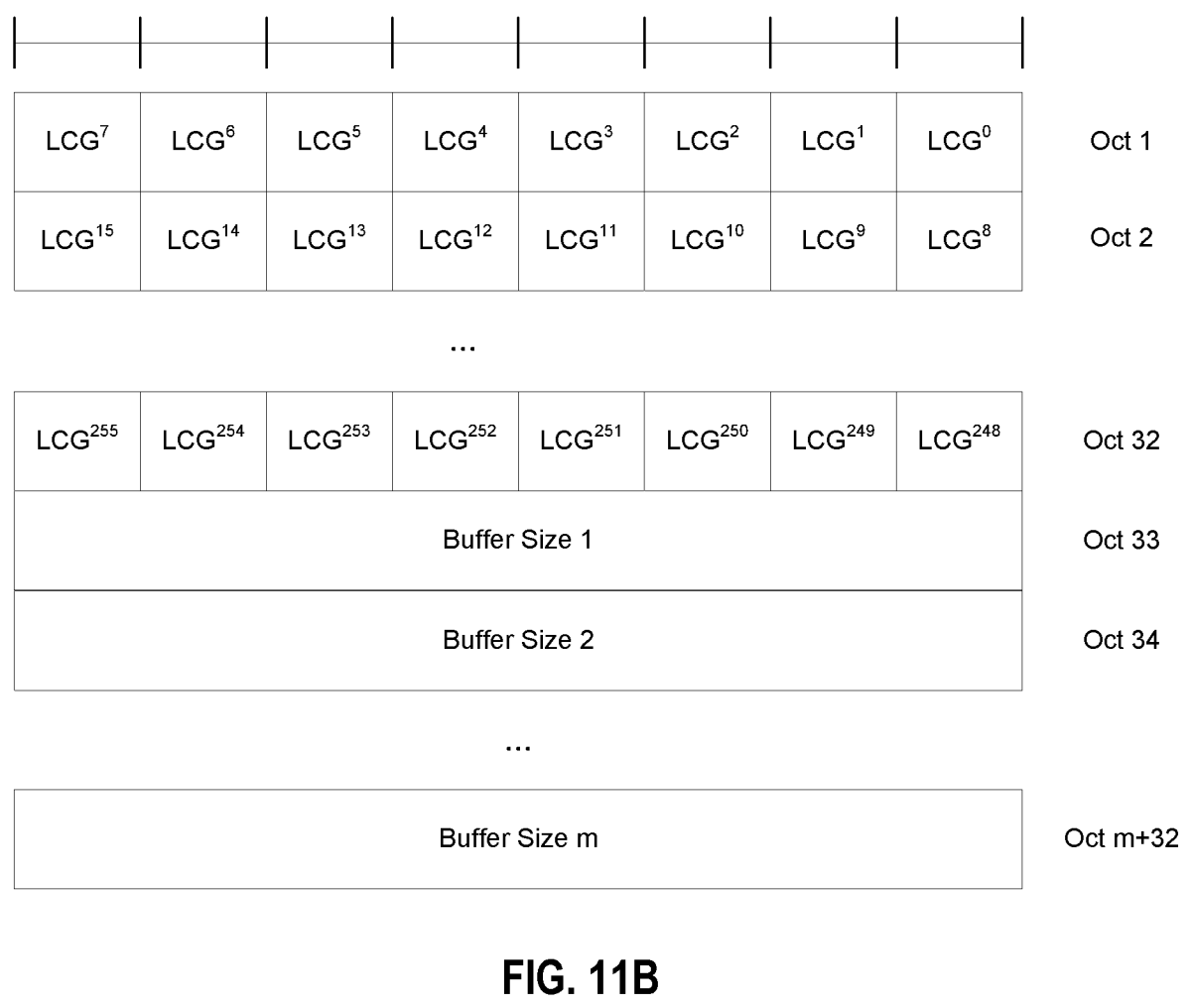

The BSR MAC CE format for the second method is represented in FIG. 11*b*, wherein the $LCG^0$ is associated to the LCG with the smallest LCG index in the configuration, $LCG^1$ is associated to the LCG with the second smallest LCG index in the configuration, $LCG^2$ is associated to the LCG with the third smallest LCG index in the configuration, and so on. Given the above description, let's consider the example in which the UE has the following configured LCG: LCG1, LCG3, LCG10, LCG23, LCG 31, LCG45, LCG 102, LCG133, LCG231, LCG240. The BSR MAC CE transmitted by the IAB node will contain two octets with the following information:

Octet 1 with the $LCG^0$ bit representing the LCG1, $LCG^1$ bit representing the LCG3, $LCG^2$ bit representing the LCG10, $LCG^3$ bit representing the LCG23, $LCG^4$ bit representing the LCG31, $LCG^5$ bit representing the LCG45, $LCG^6$ bit representing the LCG102, $LCG^7$ bit representing the LCG133

Octet 2 with the $LCG^8$ bit representing the LCG231, $LCG^9$ bit representing the LCG240, and all the other bits in the octets which are associated to non-configured LCGs.

Example Implementation of the First Method

In this section it is disclosed possible ways of implementing the methods herein in 3GPP TS 38.321. Changes with respect to the legacy specification are underlined.

Here is a possible way of implementing the first method. Changes to TS 38.321:

6.1.3.1 Buffer Status Report MAC CEs

Buffer Status Report (BSR) MAC CEs consist of either:
Short BSR format (fixed size); or
Long BSR format (variable size); or Short Truncated BSR format (fixed size); or Long Truncated BSR format (variable size).

Pre-emptive BSR MAC CE consists of:

Pre-emptive BSR format (variable size).

The BSR formats are identified by MAC subheaders with LCIDs as specified in Table 6.2.1-2.

The Pre-emptive BSR format is identified by MAC sub-headers with eLCID as specified in Table 6.2.1-2b.

The fields in the BSR MAC CE are defined as follows:

LCG ID: The Logical Channel Group ID field identifies the group of logical channel(s) whose buffer status is being reported. The length of the field is 3 bits;

LCGi: For the Long BSR format and Pre-emptive BSR format, this field indicates the presence of the Buffer Size field for the logical channel group i. The LCGi field set to 1 indicates that the Buffer Size field for the logical channel group I is reported. The LCGi field set to 0 indicates that the Buffer Size field for the logical channel group i is not reported. For the Long Truncated BSR format, this field indicates whether logical channel group i has data available. The LCGi field set to 1 indicates that logical channel group i has data available. The LCGi field set to 0 indicates that logical channel group i does not have data available. The UE shall include enough octet(s) indicating the logical channel groups such that the configured logical channel group with the highest ID value as configured in TS 38.331 can be indicated;

Buffer Size: The Buffer Size field identifies the total amount of data available according to the data volume calculation procedure in TSs 38.322 and 38.323 across all logical channels of a logical channel group after the MAC protocol data unit (PDU) has been built (i.e. after the logical channel prioritization procedure, which may result the value of the Buffer Size field to zero). The amount of data is indicated in number of bytes. The size of the RLC headers and MAC subheaders are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the LCGi. For the Long Truncated BSR format the number of Buffer Size fields included is maximised, while not exceeding the number of padding bits. For the Pre-emptive BSR format, the Buffer Size field identifies the total amount of the data expected to arrive at the IAB-MT of the node where the Pre-emptive BSR is triggered and does not include the volume of data currently available in the IAB-MT. Pre-emptive BSR format is identical to the Long BSR format.

Figure 1:
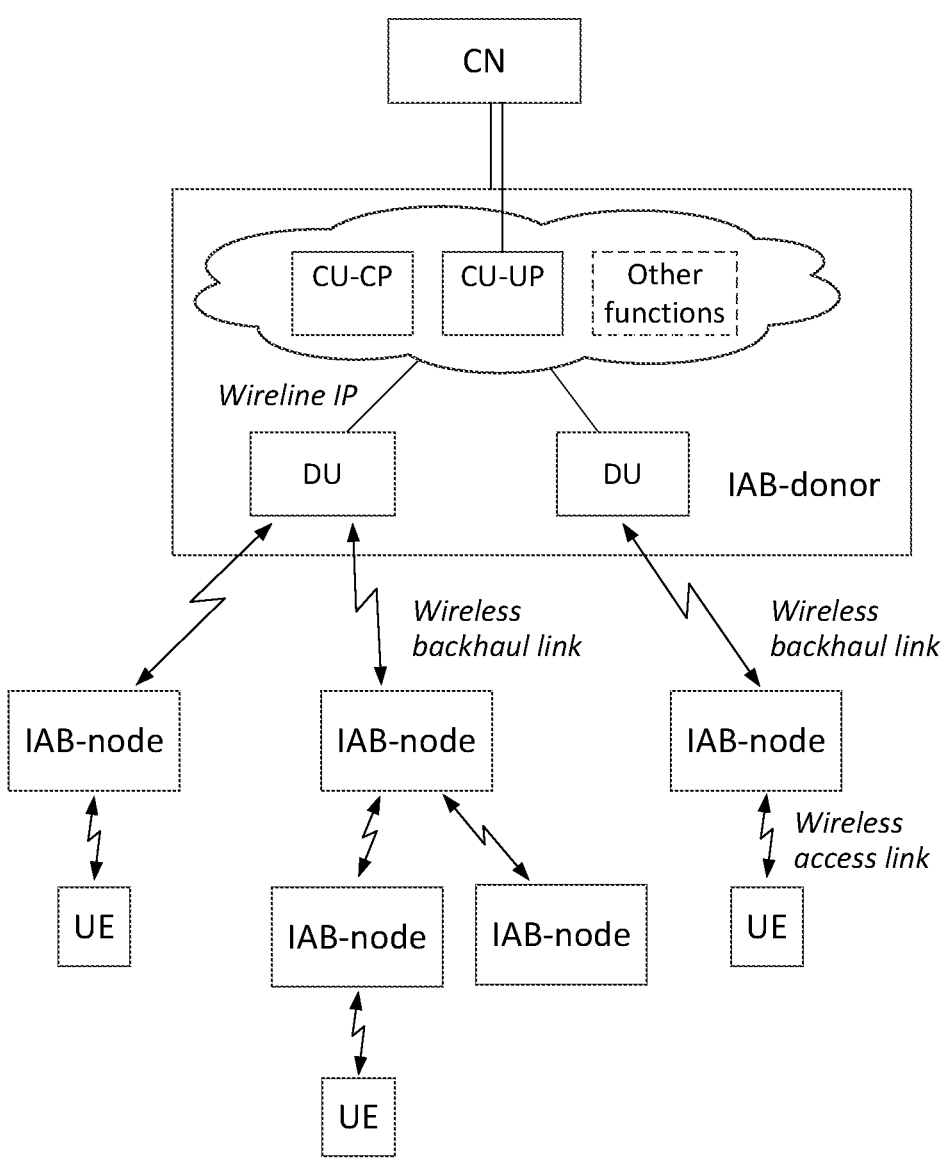
FIG. 1 is a reference diagram depicting IAB-architectures.
Figure 2:
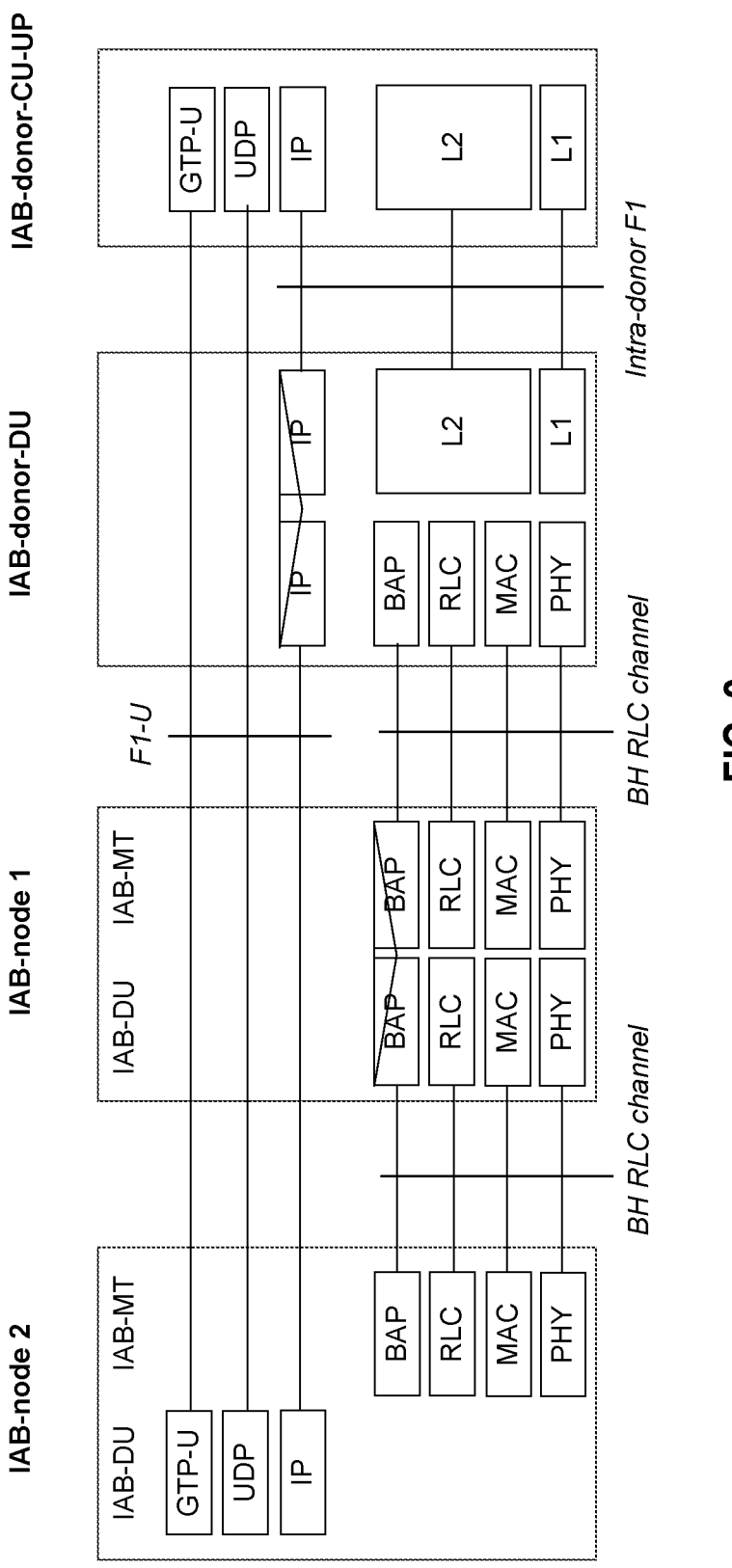
FIG. 2 shows a baseline User Plane (UP) Protocol stack for IAB in rel-16 according to prior art.
Figure 3:
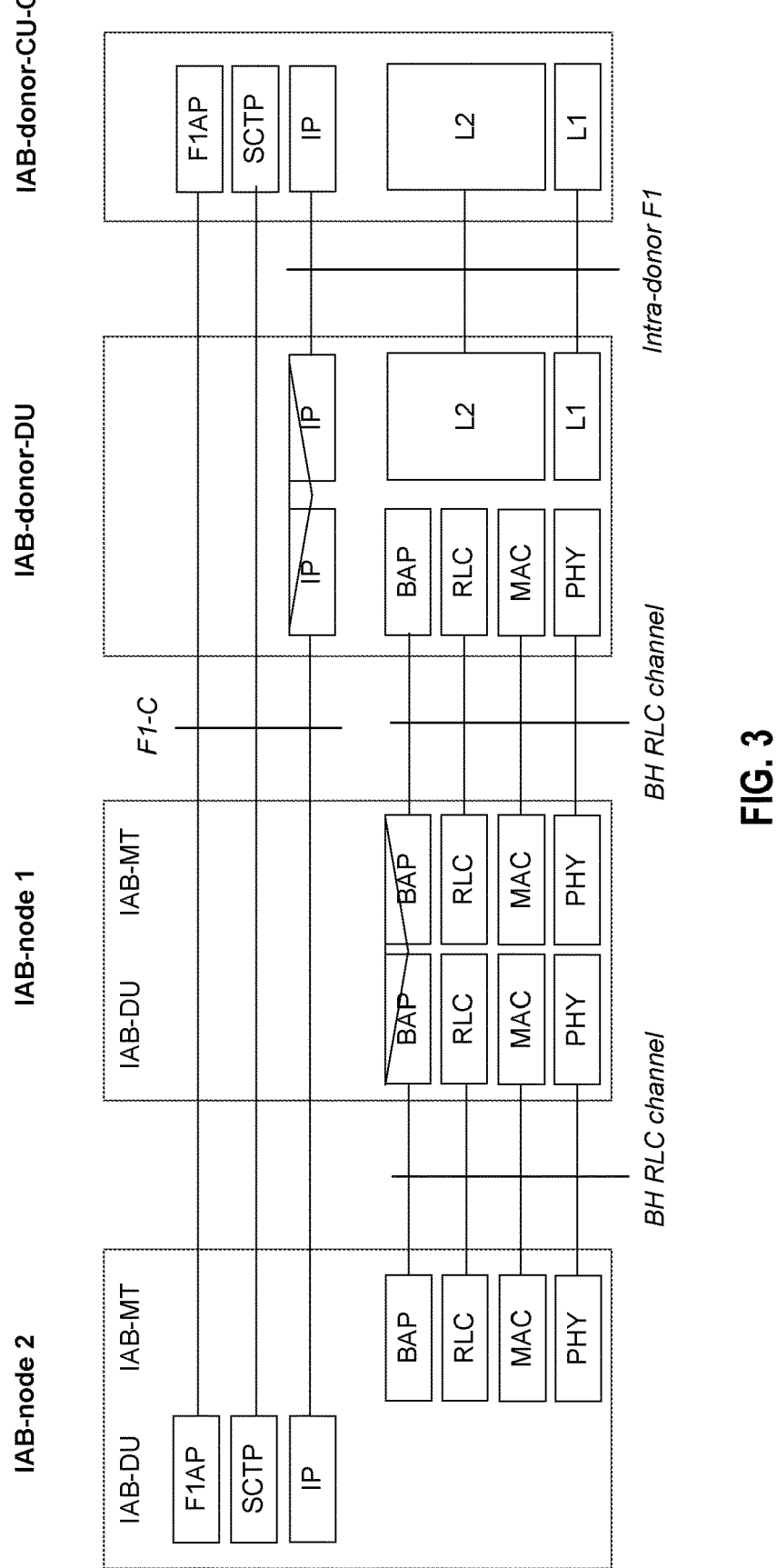
FIG. 3 shows a baseline control plane (CP) Protocol stack for IAB in rel-16 according to prior art.
Figure 4:
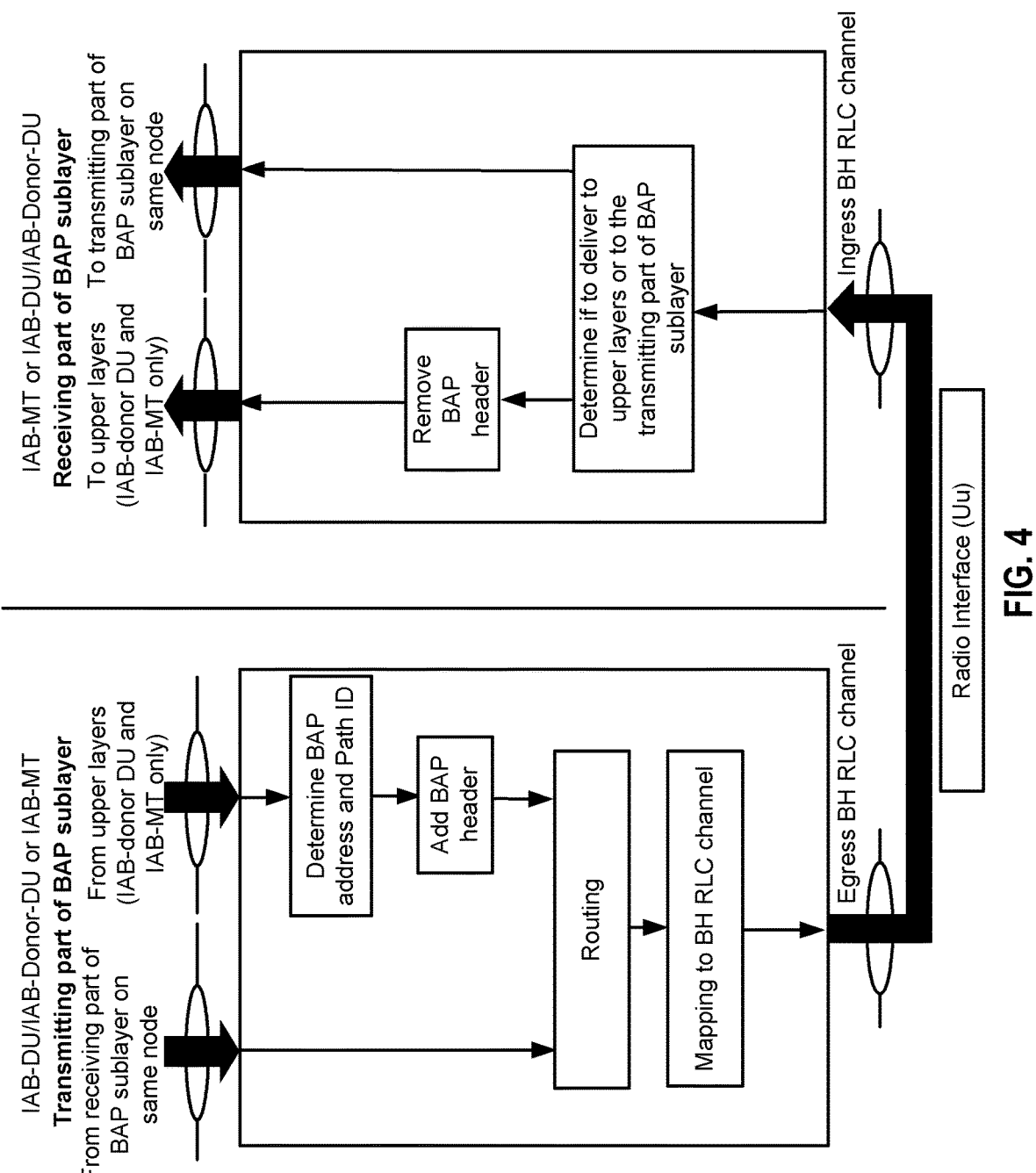
FIG. 4 shows an example of functional view of BAP sublayer according to prior art.
Figures 5, 6:
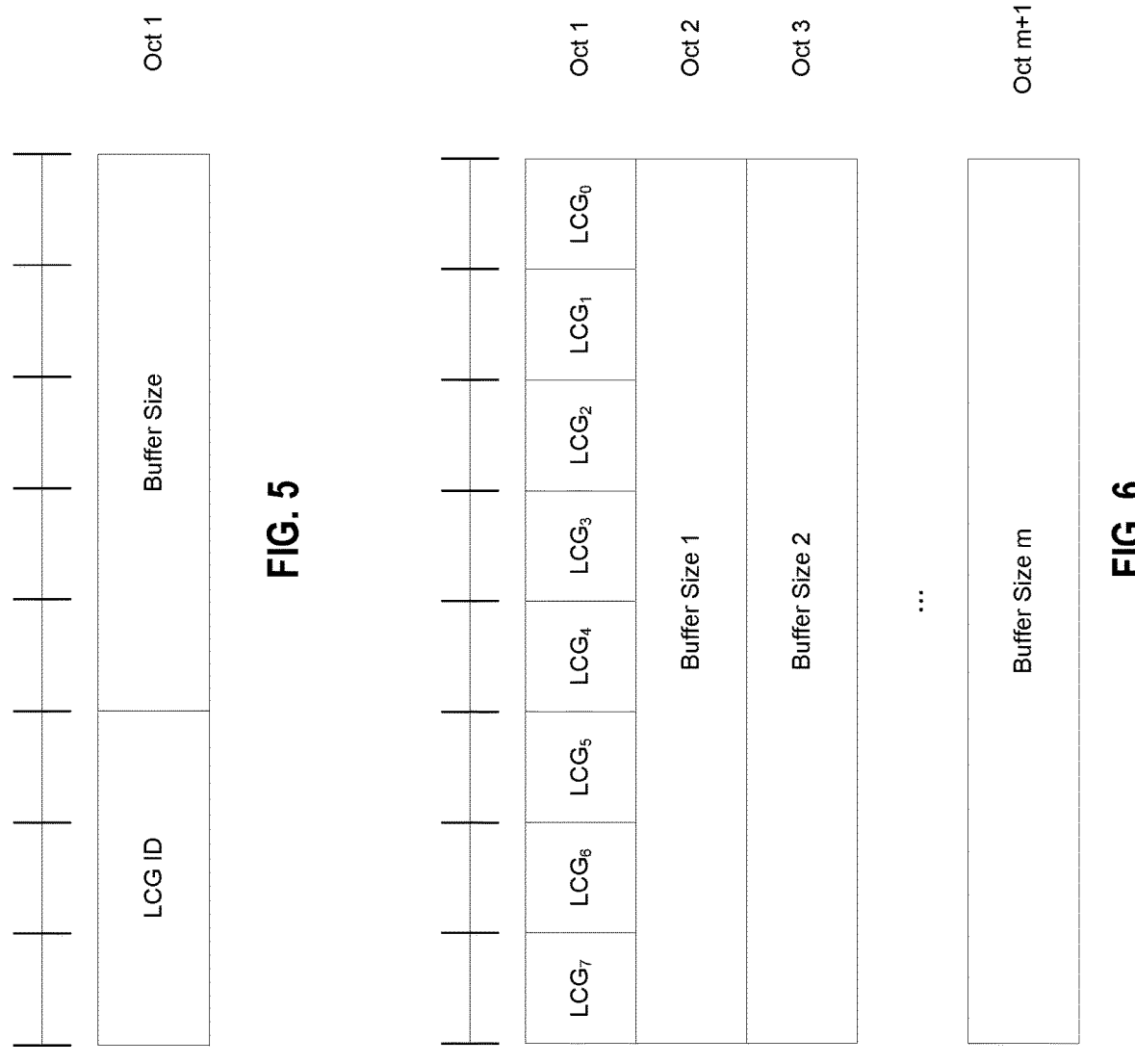
FIG. 5 shows a Short BSR and Short Truncated BSR MAC CE.
FIG. 6 shows a Long BSR, Long Truncated BSR, and Pre-emptive BSR MAC CE.

See FIG. 5

FIG. 6.1.3.1-1: Short BSR and Short Truncated BSR MAC CE

See FIG. 6

FIG. 6.1.3.1-2: Long BSR, Long Truncated BSR, and Pre-Emptive BSR MAC CE

See FIG. 11*a*

FIG. 6.1.3.1-3: Extended Long BSR, Long Truncated BSR, and Pre-Emptive BSR MAC CE

TABLE 6.1.3.1-1

| Buffer size levels (in bytes) for 5-bit Buffer Size field | | | | | | | |
|---|---|---|---|---|---|---|---|
| Index | BS value | Index | BS value | Index | BS value | Index | BS value |
| 0 | 0 | 8 | ≤102 | 16 | ≤1446 | 24 | ≤20516 |
| 1 | ≤10 | 9 | ≤142 | 17 | ≤2014 | 25 | ≤28581 |
| 2 | ≤14 | 10 | ≤198 | 18 | ≤2806 | 26 | ≤39818 |
| 3 | ≤20 | 11 | ≤276 | 19 | ≤3909 | 27 | ≤55474 |
| 4 | ≤28 | 12 | ≤384 | 20 | ≤5446 | 28 | ≤77284 |
| 5 | ≤38 | 13 | ≤535 | 21 | ≤7587 | 29 | ≤107669 |
| 6 | ≤53 | 14 | ≤745 | 22 | ≤10570 | 30 | ≤150000 |
| 7 | ≤74 | 15 | ≤1038 | 23 | ≤14726 | 31 | >150000 |

| Index | BS value | Index | BS value | Index | BS value | Index | BS value |
|---|---|---|---|---|---|---|---|
| 0 | 0 | 64 | ≤560 | 128 | ≤31342 | 192 | ≤1754595 |
| 1 | ≤10 | 65 | ≤597 | 129 | ≤33376 | 193 | ≤1868488 |
| 2 | ≤11 | 66 | ≤635 | 130 | ≤35543 | 194 | ≤1989774 |
| 3 | ≤12 | 67 | ≤677 | 131 | ≤37850 | 195 | ≤2118933 |
| 4 | ≤13 | 68 | ≤720 | 132 | ≤40307 | 196 | ≤2256475 |
| 5 | ≤14 | 69 | ≤767 | 133 | ≤42923 | 197 | ≤2402946 |
| 6 | ≤15 | 70 | ≤817 | 134 | ≤45709 | 198 | ≤2558924 |
| 7 | ≤16 | 71 | ≤870 | 135 | ≤48676 | 199 | ≤2725027 |
| 8 | ≤17 | 72 | ≤926 | 136 | ≤51836 | 200 | ≤2901912 |
| 9 | ≤18 | 73 | ≤987 | 137 | ≤55200 | 201 | ≤3090279 |
| 10 | ≤19 | 74 | ≤1051 | 138 | ≤58784 | 202 | ≤3290873 |
| 11 | ≤20 | 75 | ≤1119 | 139 | ≤62599 | 203 | ≤3504487 |
| 12 | ≤22 | 76 | ≤1191 | 140 | ≤66663 | 204 | ≤3731968 |
| 13 | ≤23 | 77 | ≤1269 | 141 | ≤70990 | 205 | ≤3974215 |
| 14 | ≤25 | 78 | ≤1351 | 142 | ≤75598 | 206 | ≤4232186 |
| 15 | ≤26 | 79 | ≤1439 | 143 | ≤80505 | 207 | ≤4506902 |
| 16 | ≤28 | 80 | ≤1532 | 144 | ≤85730 | 208 | ≤4799451 |
| 17 | ≤30 | 81 | ≤1631 | 145 | ≤91295 | 209 | ≤5110989 |
| 18 | ≤32 | 82 | ≤1737 | 146 | ≤97221 | 210 | ≤5442750 |
| 19 | ≤34 | 83 | ≤1850 | 147 | ≤103532 | 211 | ≤5796046 |
| 20 | ≤36 | 84 | ≤1970 | 148 | ≤110252 | 212 | ≤6172275 |
| 21 | ≤38 | 85 | ≤2098 | 149 | ≤117409 | 213 | ≤6572925 |
| 22 | ≤40 | 86 | ≤2234 | 150 | ≤125030 | 214 | ≤6999582 |
| 23 | ≤43 | 87 | ≤2379 | 151 | ≤133146 | 215 | ≤7453933 |
| 24 | ≤46 | 88 | ≤2533 | 152 | ≤141789 | 216 | ≤7937777 |
| 25 | ≤49 | 89 | ≤2698 | 153 | ≤150992 | 217 | ≤8453028 |
| 26 | ≤52 | 90 | ≤2873 | 154 | ≤160793 | 218 | ≤9001725 |
| 27 | ≤55 | 91 | ≤3059 | 155 | ≤171231 | 219 | ≤9586039 |
| 28 | ≤59 | 92 | ≤3258 | 156 | ≤182345 | 220 | ≤10208280 |
| 29 | ≤62 | 93 | ≤3469 | 157 | ≤194182 | 221 | ≤10870913 |
| 30 | ≤66 | 94 | ≤3694 | 158 | ≤206786 | 222 | ≤11576557 |
| 31 | ≤71 | 95 | ≤3934 | 159 | ≤220209 | 223 | ≤12328006 |
| 32 | ≤75 | 96 | ≤4189 | 160 | ≤234503 | 224 | ≤13128233 |
| 33 | ≤80 | 97 | ≤4461 | 161 | ≤249725 | 225 | ≤13980403 |
| 34 | ≤85 | 98 | ≤4751 | 162 | ≤265935 | 226 | ≤14887889 |
| 35 | ≤91 | 99 | ≤5059 | 163 | ≤283197 | 227 | ≤15854280 |
| 36 | ≤97 | 100 | ≤5387 | 164 | ≤301579 | 228 | ≤16883401 |
| 37 | ≤103 | 101 | ≤5737 | 165 | ≤321155 | 229 | ≤17979324 |
| 38 | ≤110 | 102 | ≤6109 | 166 | ≤342002 | 230 | ≤19146385 |
| 39 | ≤117 | 103 | ≤6506 | 167 | ≤364202 | 231 | ≤20389201 |
| 40 | ≤124 | 104 | ≤6928 | 168 | ≤387842 | 232 | ≤21712690 |
| 41 | ≤132 | 105 | ≤7378 | 169 | ≤413018 | 233 | ≤23122088 |
| 42 | ≤141 | 106 | ≤7857 | 170 | ≤439827 | 234 | ≤24622972 |
| 43 | ≤150 | 107 | ≤8367 | 171 | ≤468377 | 235 | ≤26221280 |
| 44 | ≤160 | 108 | ≤8910 | 172 | ≤498780 | 236 | ≤27923336 |
| 45 | ≤170 | 109 | ≤9488 | 173 | ≤531156 | 237 | ≤29735875 |
| 46 | ≤181 | 110 | ≤10104 | 174 | ≤565634 | 238 | ≤31666069 |
| 47 | ≤193 | 111 | ≤10760 | 175 | ≤602350 | 239 | ≤33721553 |
| 48 | ≤205 | 112 | ≤11458 | 176 | ≤641449 | 240 | ≤35910462 |
| 49 | ≤218 | 113 | ≤12202 | 177 | ≤683087 | 241 | ≤38241455 |
| 50 | ≤233 | 114 | ≤12994 | 178 | ≤727427 | 242 | ≤40723756 |
| 51 | ≤248 | 115 | ≤13838 | 179 | ≤774645 | 243 | ≤43367187 |
| 52 | ≤264 | 116 | ≤14736 | 180 | ≤824928 | 244 | ≤46182206 |
| 53 | ≤281 | 117 | ≤15692 | 181 | ≤878475 | 245 | ≤49179951 |
| 54 | ≤299 | 118 | ≤16711 | 182 | ≤935498 | 246 | ≤52372284 |
| 55 | ≤318 | 119 | ≤17795 | 183 | ≤996222 | 247 | ≤55771835 |
| 56 | ≤339 | 120 | ≤18951 | 18 | ≤1060888 | 248 | ≤59392055 |
| 57 | ≤361 | 121 | ≤20181 | 185 | ≤1129752 | 249 | ≤63247269 |
| 58 | ≤384 | 122 | ≤21491 | 186 | ≤1203085 | 250 | ≤67352729 |
| 59 | ≤409 | 123 | ≤22885 | 187 | ≤1281179 | 251 | ≤71724679 |
| 60 | ≤436 | 124 | ≤24371 | 188 | ≤1364342 | 252 | ≤76380419 |
| 61 | ≤464 | 125 | ≤25953 | 189 | ≤1452903 | 253 | ≤81338368 |

TABLE 6.1.3.1-1-continued

| Buffer size levels (in bytes) for 5-bit Buffer Size field | | | | | | | |
|---|---|---|---|---|---|---|---|
| 62 | ≤494 | 126 | ≤27638 | 190 | ≤1547213 | 254 | >81338368 |
| 63 | ≤526 | 127 | ≤29431 | 191 | ≤1647644 | 255 | Reserved |

Table 6.1.3.1-2: Buffer Size Levels (in Bytes) for 8-Bit Buffer Size Field

In this section it is represented another possible way of implementing the first method in TS 38.321. Changes with respect to the legacy specification are underlined.

Changes to TS 38.321:

6.1.3.1 Buffer Status Report MAC CEs

Buffer Status Report (BSR) MAC CEs consist of either:

Short BSR format (fixed size); or

Long BSR format (variable size); or

Short Truncated BSR format (fixed size); or

Long Truncated BSR format (variable size).

Pre-emptive BSR MAC CE consists of:

Pre-emptive BSR format (variable size).

The BSR formats are identified by MAC subheaders with LCIDs as specified in Table 6.2.1-2.

The Pre-emptive BSR format is identified by MAC subheaders with eLCID as specified in Table 6.2.1-2b.

The fields in the BSR MAC CE are defined as follows:

LCG ID: The Logical Channel Group ID field identifies the group of logical channel(s) whose buffer status is being reported. The length of the field is 3 bits;

LCGi: For the Long BSR format and Pre-emptive BSR format, this field indicates the presence of the Buffer Size field for the logical channel group i. The LCGi field set to 1 indicates that the Buffer Size field for the logical channel group I is reported. The LCGi field set to 0 indicates that the Buffer Size field for the logical channel group i is not reported. For the Long Truncated BSR format, this field indicates whether logical channel group i has data available. The LCGi field set to 1 indicates that logical channel group i has data available. The LCGi field set to 0 indicates that logical channel group i does not have data available. If the index of the LCG with the highest configured LCG index is 7 or less, the UE includes one octet with LCGi-fields, if the index of the LCG with the highest configured LCG index is 15 or less, the UE includes two octets with LCGi-fields, and so on until, if the index of the LCG with the highest configured LCG index is 255 or less, the UE includes 32 octets with LCGi-fields.

Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC headers and MAC subheaders are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the LCGi. For the Long Truncated BSR format the number of Buffer Size fields included is maximised, while not exceeding the number of padding bits. For the Pre-emptive BSR format, the Buffer Size field identifies the total amount of the data expected to arrive at the IAB-MT of the node where the Pre-emptive BSR is triggered and does not include the volume of data currently available in the IAB-MT. Pre-emptive BSR format is identical to the Long BSR format.

See FIG. 5

FIG. 6.1.3.1-1: Short BSR and Short Truncated BSR MAC CE

See FIG. 6

FIG. 6.1.3.1-2: Long BSR, Long Truncated BSR, and Pre-Emptive BSR MAC CE

See FIG. 11a

FIG. 6.1.3.1-3: Extended Long BSR, Long Truncated BSR, and Pre-Emptive BSR MAC CE

TABLE 6.1.3.1-1

| Buffer size levels (in bytes) for 5 bit Buffer Size field | | | | | | | |
|---|---|---|---|---|---|---|---|
| Index | BS value | Index | BS value | Index | BS value | Index | BS value |
| 0 | 0 | 8 | ≤102 | 16 | ≤1446 | 24 | ≤20516 |
| 1 | ≤10 | 9 | ≤142 | 17 | ≤2014 | 25 | ≤28581 |
| 2 | ≤14 | 10 | ≤198 | 18 | ≤2806 | 26 | ≤39818 |
| 3 | ≤20 | 11 | ≤276 | 19 | ≤3909 | 27 | ≤55474 |
| 4 | ≤28 | 12 | ≤384 | 20 | ≤5446 | 28 | ≤77284 |
| 5 | ≤38 | 13 | ≤535 | 21 | ≤7587 | 29 | ≤107669 |
| 6 | ≤53 | 14 | ≤745 | 22 | ≤10570 | 30 | ≤150000 |
| 7 | ≤74 | 15 | ≤1038 | 23 | ≤14726 | 31 | >150000 |
| Index | BS value | Index | BS value | Index | BS value | Index | BS value |
| 0 | 0 | 64 | ≤560 | 128 | ≤31342 | 192 | ≤1754595 |
| 1 | ≤10 | 65 | ≤597 | 129 | ≤33376 | 193 | ≤1868488 |
| 2 | ≤11 | 66 | ≤635 | 130 | ≤35543 | 194 | ≤1989774 |
| 3 | ≤12 | 67 | ≤677 | 131 | ≤37850 | 195 | ≤2118933 |
| 4 | ≤13 | 68 | ≤720 | 132 | ≤40307 | 196 | ≤2256475 |
| 5 | ≤14 | 69 | ≤767 | 133 | ≤42923 | 197 | ≤2402946 |
| 6 | ≤15 | 70 | ≤817 | 134 | ≤45709 | 198 | ≤2558924 |

TABLE 6.1.3.1-1-continued

| Buffer size levels (in bytes) for 5 bit Buffer Size field | | | | | | | |
|---|---|---|---|---|---|---|---|
| 7 | ≤16 | 71 | ≤87 | 135 | ≤48676 | 199 | ≤2725027 |
| 8 | ≤17 | 72 | ≤926 | 136 | ≤51836 | 200 | ≤2901912 |
| 9 | ≤18 | 73 | ≤987 | 137 | ≤55200 | 201 | ≤3090279 |
| 10 | ≤19 | 74 | ≤1051 | 138 | ≤58784 | 202 | ≤3290873 |
| 11 | ≤20 | 75 | ≤1119 | 139 | ≤62599 | 203 | ≤3504487 |
| 12 | ≤22 | 76 | ≤1191 | 140 | ≤66663 | 204 | ≤3731968 |
| 13 | ≤23 | 77 | ≤1269 | 141 | ≤70990 | 205 | ≤3974215 |
| 14 | ≤25 | 78 | ≤1351 | 142 | ≤75598 | 206 | ≤4232186 |
| 15 | ≤26 | 79 | ≤1439 | 143 | ≤80505 | 207 | ≤4506902 |
| 16 | ≤28 | 80 | ≤1532 | 144 | ≤85730 | 208 | ≤4799451 |
| 17 | ≤30 | 81 | ≤1631 | 145 | ≤91295 | 209 | ≤5110989 |
| 18 | ≤32 | 82 | ≤1737 | 146 | ≤97221 | 210 | ≤5442750 |
| 19 | ≤34 | 83 | ≤1850 | 147 | ≤103532 | 211 | ≤5796046 |
| 20 | ≤36 | 84 | ≤1970 | 148 | ≤110252 | 212 | ≤6172275 |
| 21 | ≤38 | 85 | ≤2098 | 149 | ≤117409 | 213 | ≤6572925 |
| 22 | ≤40 | 86 | ≤2234 | 150 | ≤125030 | 214 | ≤6999582 |
| 23 | ≤43 | 87 | ≤2379 | 151 | ≤133146 | 215 | ≤7453933 |
| 24 | ≤46 | 88 | ≤2533 | 152 | ≤141789 | 216 | ≤7937777 |
| 25 | ≤49 | 89 | ≤2698 | 153 | ≤150992 | 217 | ≤8453028 |
| 26 | ≤52 | 90 | ≤2873 | 154 | ≤160793 | 218 | ≤9001725 |
| 27 | ≤55 | 91 | ≤3059 | 155 | ≤171231 | 219 | ≤9586039 |
| 28 | ≤59 | 92 | ≤3258 | 156 | ≤182345 | 220 | ≤10208280 |
| 29 | ≤62 | 93 | ≤3469 | 157 | ≤194182 | 221 | ≤10870913 |
| 30 | ≤66 | 94 | ≤3694 | 158 | ≤206786 | 222 | ≤11576557 |
| 31 | ≤71 | 95 | ≤3934 | 159 | ≤220209 | 223 | ≤12328006 |
| 32 | ≤75 | 96 | ≤4189 | 160 | ≤234503 | 224 | ≤13128233 |
| 33 | ≤80 | 97 | ≤4461 | 161 | ≤249725 | 225 | ≤13980403 |
| 34 | ≤85 | 98 | ≤4751 | 162 | ≤265935 | 226 | ≤14887889 |
| 35 | ≤91 | 99 | ≤5059 | 163 | ≤283197 | 227 | ≤15854280 |
| 36 | ≤97 | 100 | ≤5387 | 164 | ≤301579 | 228 | ≤16883401 |
| 37 | ≤103 | 101 | ≤5737 | 165 | ≤321155 | 229 | ≤17979324 |
| 38 | ≤110 | 102 | ≤6109 | 166 | ≤342002 | 230 | ≤19146385 |
| 39 | ≤117 | 103 | ≤6506 | 167 | ≤364202 | 231 | ≤20389201 |
| 40 | ≤124 | 104 | ≤6928 | 168 | ≤387842 | 232 | ≤21712690 |
| 41 | ≤132 | 105 | ≤7378 | 169 | ≤413018 | 233 | ≤23122088 |
| 42 | ≤141 | 106 | ≤7857 | 170 | ≤439827 | 234 | ≤24622972 |
| 43 | ≤150 | 107 | ≤8367 | 171 | ≤468377 | 235 | ≤26221280 |
| 44 | ≤160 | 108 | ≤8910 | 172 | ≤498780 | 236 | ≤27923336 |
| 45 | ≤170 | 109 | ≤9488 | 173 | ≤531156 | 237 | ≤29735875 |
| 46 | ≤181 | 110 | ≤10104 | 174 | ≤565634 | 238 | ≤31666069 |
| 47 | ≤193 | 111 | ≤10760 | 175 | ≤602350 | 239 | ≤33721553 |
| 48 | ≤205 | 112 | ≤11458 | 176 | ≤641449 | 240 | ≤35910462 |
| 49 | ≤218 | 113 | ≤12202 | 177 | ≤683087 | 241 | ≤38241455 |
| 50 | ≤233 | 114 | ≤12994 | 178 | ≤727427 | 242 | ≤40723756 |
| 51 | ≤248 | 115 | ≤13838 | 179 | ≤774645 | 243 | ≤43367187 |
| 52 | ≤264 | 116 | ≤14736 | 180 | ≤824928 | 244 | ≤46182206 |
| 53 | ≤281 | 117 | ≤15692 | 181 | ≤878475 | 245 | ≤49179951 |
| 54 | ≤299 | 118 | ≤16711 | 182 | ≤935498 | 246 | ≤52372284 |
| 55 | ≤318 | 119 | ≤17795 | 183 | ≤996222 | 247 | ≤55771835 |
| 56 | ≤339 | 120 | ≤18951 | 184 | ≤1060888 | 248 | ≤59392055 |
| 57 | ≤361 | 121 | ≤20181 | 185 | ≤1129752 | 249 | ≤63247269 |
| 58 | ≤384 | 122 | ≤21491 | 186 | ≤1203085 | 250 | ≤67352729 |
| 59 | ≤409 | 123 | ≤22885 | 187 | ≤1281179 | 251 | ≤71724679 |
| 60 | ≤436 | 124 | ≤24371 | 188 | ≤1364342 | 252 | ≤76380419 |
| 61 | ≤464 | 125 | ≤25953 | 189 | ≤1452903 | 253 | ≤81338368 |
| 62 | ≤494 | 126 | ≤27638 | 190 | ≤1547213 | 254 | >81338368 |
| 63 | ≤526 | 127 | ≤29431 | 191 | ≤1647644 | 255 | Reserved |

Table 6.1.3.1-2: Buffer Size Levels (in Bytes) for 8-Bit Buffer Size Field

In this section it is represented a possible way of implementing the second method in TS 38.321. Changes with respect to the legacy specification are underlined.

Changes to TS 38.321:

6.1.3.1 Buffer Status Report MAC CEs

Buffer Status Report (BSR) MAC CEs consist of either:

Short BSR format (fixed size); or

Long BSR format (variable size); or

Short Truncated BSR format (fixed size); or

Long Truncated BSR format (variable size).

Pre-emptive BSR MAC CE consists of:

Pre-emptive BSR format (variable size).

The BSR formats are identified by MAC subheaders with LCIDs as specified in Table 6.2.1-2.

The Pre-emptive BSR format is identified by MAC subheaders with eLCID as specified in Table 6.2.1-2b.

The fields in the BSR MAC CE are defined as follows:

LCG ID: The Logical Channel Group ID field identifies the group of logical channel(s) whose buffer status is being reported. The length of the field is 3 bits;

LCGi: For the Long BSR format and Pre-emptive BSR format, this field indicates the presence of the Buffer Size field for the logical channel group i. The LCGi field set to 1 indicates that the Buffer Size field for the logical channel group I is reported. The LCGi field set to 0 indicates that the Buffer Size field for the logical channel group i is not reported. For the Long Truncated BSR format, this field indicates whether logical channel group i has data available. The LCGi field set to 1 indicates that logical channel group i has data available. The LCGi field set to 0 indicates that logical channel group i does not have data available;

Buffer Size: The Buffer Size field identifies the total amount of data available according to the data volume calculation procedure in TSs 38.322 [3] and 38.323 [4] across all logical channels of a logical channel group after the MAC PDU has been built (i.e. after the logical channel prioritization procedure, which may result the value of the Buffer Size field to zero). The amount of data is indicated in number of bytes. The size of the RLC headers and MAC subheaders are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in Tables 6.1.3.1-1 and 6.1.3.1-2, respectively. For the Long BSR format and the Long Truncated BSR format, the Buffer Size fields are included in ascending order based on the LCGi. For the Long Truncated BSR format the number of Buffer Size fields included is maximised, while not exceeding the number of padding bits. For the Pre-emptive BSR format, the Buffer Size field identifies the total amount of the data expected to arrive at the IAB-MT of the node where the Pre-emptive BSR is triggered and does not include the volume of data currently available in the IAB-MT. Pre-emptive BSR format is identical to the Long BSR format.

LCGi: For the Long BSR format and Pre-emptive BSR format, this field indicates the presence of the Buffer Size field for the configured logical channel group with the i smallest ID as configured in TS38.331. The LCGi field set to 1 indicates that the Buffer Size field for the configured logical channel group with smallest I ID is reported. The LCGi field set to 0 indicates that the Buffer Size field for the configured logical channel group with smallest i ID is not reported. For the Long Truncated BSR format, this field indicates whether logical channel group with smallest i ID has data available. The LCGi field set to 1 indicates that logical channel group with smallest i ID has data available. The LCGi field set to 0 indicates that logical channel group with smallest i ID does not have data available. The UE shall include enough octet(s) indicating the logical channel groups such that all the configured logical channel groups as configured in TS38.331 can be indicated;

See FIG. 5

FIG. 6.1.3.1-1: Short BSR and Short Truncated BSR MAC CE

See FIG. 6

FIG. 6.1.3.1-2: Long BSR, Long Truncated BSR, and Pre-Emptive BSR MAC CE

See FIG. 11*b*

FIG. 6.1.3.1-3: Extended Long BSR, Long Truncated BSR, and Pre-Emptive BSR MAC CE

TABLE 6.1.3.1-1

| Buffer size levels (in bytes) for 5-bit Buffer Size field | | | | | | | |
|---|---|---|---|---|---|---|---|
| Index | BS value | Index | BS value | Index | BS value | Index | BS value |
| 0 | 0 | 8 | ≤102 | 16 | ≤1446 | 24 | ≤20516 |
| 1 | ≤10 | 9 | ≤142 | 17 | ≤2014 | 25 | ≤28581 |
| 2 | ≤14 | 10 | ≤198 | 18 | ≤2806 | 26 | ≤39818 |
| 3 | ≤20 | 11 | ≤276 | 19 | ≤3909 | 27 | ≤55474 |
| 4 | ≤28 | 12 | ≤384 | 20 | ≤5446 | 28 | ≤77284 |
| 5 | ≤38 | 13 | ≤535 | 21 | ≤7587 | 29 | ≤107669 |
| 6 | ≤53 | 14 | ≤745 | 22 | ≤10570 | 30 | ≤150000 |
| 7 | ≤74 | 15 | ≤1038 | 23 | ≤14726 | 31 | >150000 |

| Index | BS value | Index | BS value | Index | BS value | Index | BS value |
|---|---|---|---|---|---|---|---|
| 0 | 0 | 64 | ≤560 | 128 | ≤31342 | 192 | ≤1754595 |
| 1 | ≤10 | 65 | ≤597 | 129 | ≤33376 | 193 | ≤1868488 |
| 2 | ≤11 | 66 | ≤635 | 130 | ≤35543 | 194 | ≤1989774 |
| 3 | ≤12 | 67 | ≤677 | 131 | ≤37850 | 195 | ≤2118933 |
| 4 | ≤13 | 68 | ≤720 | 132 | ≤40307 | 196 | ≤2256475 |
| 5 | ≤14 | 69 | ≤767 | 133 | ≤42923 | 197 | ≤2402946 |
| 6 | ≤15 | 70 | ≤817 | 134 | ≤45709 | 198 | ≤2558924 |
| 7 | ≤16 | 71 | ≤870 | 135 | ≤48676 | 199 | ≤2725027 |
| 8 | ≤17 | 72 | ≤926 | 136 | ≤51836 | 200 | ≤2901912 |
| 9 | ≤18 | 73 | ≤987 | 137 | ≤55200 | 201 | ≤3090279 |
| 10 | ≤19 | 74 | ≤1051 | 138 | ≤58784 | 202 | ≤3290873 |
| 11 | ≤20 | 75 | ≤1119 | 139 | ≤62599 | 203 | ≤3504487 |
| 12 | ≤22 | 76 | ≤1191 | 140 | ≤66663 | 204 | ≤3731968 |
| 13 | ≤23 | 77 | ≤1269 | 141 | ≤70990 | 205 | ≤3974215 |
| 14 | ≤25 | 78 | ≤1351 | 142 | ≤75598 | 206 | ≤4232186 |
| 15 | ≤26 | 79 | ≤1439 | 143 | ≤80505 | 207 | ≤4506902 |
| 16 | ≤28 | 80 | ≤1532 | 144 | ≤85730 | 208 | ≤4799451 |
| 17 | ≤30 | 81 | ≤1631 | 145 | ≤91295 | 209 | ≤5110989 |
| 18 | ≤32 | 82 | ≤1737 | 146 | ≤97221 | 210 | ≤5442750 |
| 19 | ≤34 | 83 | ≤1850 | 147 | ≤103532 | 211 | ≤5796046 |
| 20 | ≤36 | 84 | ≤1970 | 148 | ≤110252 | 212 | ≤6172275 |
| 21 | ≤38 | 85 | ≤2098 | 149 | ≤117409 | 213 | ≤6572925 |
| 22 | ≤40 | 86 | ≤2234 | 150 | ≤125030 | 214 | ≤6999582 |
| 23 | ≤43 | 87 | ≤2379 | 151 | ≤133146 | 215 | ≤7453933 |
| 24 | ≤46 | 88 | ≤2533 | 152 | ≤141789 | 216 | ≤7937777 |
| 25 | ≤49 | 89 | ≤2698 | 153 | ≤150992 | 217 | ≤8453028 |
| 26 | ≤52 | 90 | ≤2873 | 154 | ≤160793 | 218 | ≤9001725 |
| 27 | ≤55 | 91 | ≤3059 | 155 | ≤171231 | 219 | ≤9586039 |

TABLE 6.1.3.1-1-continued

| Buffer size levels (in bytes) for 5-bit Buffer Size field | | | | | | | |
|---|---|---|---|---|---|---|---|
| 28 | ≤59 | 92 | ≤3258 | 156 | ≤182345 | 220 | ≤10208280 |
| 29 | ≤62 | 93 | ≤3469 | 157 | ≤194182 | 221 | ≤10870913 |
| 30 | ≤66 | 94 | ≤3694 | 158 | ≤206786 | 222 | ≤11576557 |
| 31 | ≤71 | 95 | ≤3934 | 159 | ≤220209 | 223 | ≤12328006 |
| 32 | ≤75 | 96 | ≤4189 | 160 | ≤234503 | 224 | ≤13128233 |
| 33 | ≤80 | 97 | ≤4461 | 161 | ≤249725 | 225 | ≤13980403 |
| 34 | ≤85 | 98 | ≤4751 | 162 | ≤265935 | 226 | ≤14887889 |
| 35 | ≤91 | 99 | ≤5059 | 163 | ≤283197 | 227 | ≤15854280 |
| 36 | ≤97 | 100 | ≤5387 | 164 | ≤301579 | 228 | ≤16883401 |
| 37 | ≤103 | 101 | ≤5737 | 165 | ≤321155 | 229 | ≤17979324 |
| 38 | ≤110 | 102 | ≤6109 | 166 | ≤342002 | 230 | ≤19146385 |
| 39 | ≤117 | 103 | ≤6506 | 167 | ≤364202 | 231 | ≤20389201 |
| 40 | ≤124 | 104 | ≤6928 | 168 | ≤387842 | 232 | ≤21712690 |
| 41 | ≤132 | 105 | ≤7378 | 169 | ≤413018 | 233 | ≤23122088 |
| 42 | ≤141 | 106 | ≤7857 | 170 | ≤439827 | 234 | ≤24622972 |
| 43 | ≤150 | 107 | ≤8367 | 171 | ≤468377 | 235 | ≤26221280 |
| 44 | ≤160 | 108 | ≤8910 | 172 | ≤498780 | 236 | ≤27923336 |
| 45 | ≤170 | 109 | ≤9488 | 173 | ≤531156 | 237 | ≤29735875 |
| 46 | ≤181 | 110 | ≤10104 | 174 | ≤565634 | 238 | ≤31666069 |
| 47 | ≤193 | 111 | ≤10760 | 175 | ≤602350 | 239 | ≤33721553 |
| 48 | ≤205 | 112 | ≤11458 | 176 | ≤641449 | 240 | ≤35910462 |
| 49 | ≤218 | 113 | ≤12202 | 177 | ≤683087 | 241 | ≤38241455 |
| 50 | ≤233 | 114 | ≤12994 | 178 | ≤727427 | 242 | ≤40723756 |
| 51 | ≤248 | 115 | ≤13838 | 179 | ≤774645 | 243 | ≤43367187 |
| 52 | ≤264 | 116 | ≤14736 | 180 | ≤824928 | 244 | ≤46182206 |
| 53 | ≤281 | 117 | ≤15692 | 181 | ≤878475 | 245 | ≤49179951 |
| 54 | ≤299 | 118 | ≤16711 | 182 | ≤935498 | 246 | ≤52372284 |
| 55 | ≤318 | 119 | ≤17795 | 183 | ≤996222 | 247 | ≤55771835 |
| 56 | ≤339 | 120 | ≤18951 | 184 | ≤1060888 | 248 | ≤59392055 |
| 57 | ≤361 | 121 | ≤20181 | 185 | ≤1129752 | 249 | ≤63247269 |
| 58 | ≤384 | 122 | ≤21491 | 186 | ≤1203085 | 250 | ≤67352729 |
| 59 | ≤409 | 123 | ≤22885 | 187 | ≤1281179 | 251 | ≤71724679 |
| 60 | ≤436 | 124 | ≤24371 | 188 | ≤1364342 | 252 | ≤76380419 |
| 61 | ≤464 | 125 | ≤25953 | 189 | ≤1452903 | 253 | ≤81338368 |
| 62 | ≤494 | 126 | ≤27638 | 190 | ≤1547213 | 254 | >81338368 |
| 63 | ≤526 | 127 | ≤29431 | 191 | ≤1647644 | 255 | Reserved |

Table 6.1.3.1-2: Buffer Size Levels (in Bytes) for
8-Bit Buffer Size Field

FIG. 12 is a block diagram depicting, in two embodiments, the first network node 120 for handling communication in the wireless communications network 1 according to embodiments herein. In some embodiments, the first network node 120 is an IAB node, the UE 10, the first intermediate radio network node 13, or the first radio network node 12.

The first network node 120 may comprise processing circuitry 1201, e.g. one or more processors, configured to perform the methods herein.

The first network node 120 may comprise determining unit 1202. The first network node 120, the processing circuitry 1201, and/or the determining unit 1202 is configured to determine the version of the buffer status report (e.g., such as a version of a BSR MAC CE) to use based on the logical channel information configured at the first network node 120. Logical channel information may relate to LCGs configured at the first network node 120.

Versions may be defined by number of octets used. In some embodiments, the version of the BSR may comprise a number of octets, wherein the number of octets (including the LCGs) depends on a configured LCG with a highest index. In other embodiments, the version of BSR may comprise a bitmap, wherein each bit of the bitmap is associated to a configured LCG. Thus, the number of octets of the BSR may be based on the number of LCG indices configured at the first network node 120 in some embodiments.

The first network node 120 may comprise a transmitting unit 1203, e.g. a transmitter or a transceiver. The first network node 120, the processing circuitry 1201, and/or the transmitting unit 1203 is configured to transmit the BSR of the determined version to the second network node 150.

The first network node 120 in some embodiments further comprises a memory 1205. The memory 1205 comprises one or more units to be used to store data on, such as indications, BSR versions, LCG information, contexts, measurements, thresholds, data related to nodes, and applications to perform the methods disclosed herein when being executed, and similar. Furthermore, the first network node 120 in some embodiments may comprise a communication interface 1208 such as comprising a transmitter, a receiver and/or a transceiver.

The methods according to the embodiments described herein for the first network node 120 may be respectively implemented by means of e.g. a computer program product 1206 or a computer program, comprising instructions, i.e., software code portions, which, when executed on at least one processor, cause the at least one processor to carry out the actions described herein, as performed by the first network node 120. The computer program product 1206 may be stored on a computer-readable storage medium 1207, e.g. a disc, a universal serial bus (USB) stick or similar. The computer-readable storage medium 1207, having stored thereon the computer program product, may comprise the instructions which, when executed on at least one processor, cause the at least one processor to carry out the actions described herein, as performed by the first network node 120. In some embodiments, the computer-readable storage medium may be a transitory or a non-transitory computer-readable storage medium. Thus, embodiments herein may disclose a first radio network node 120 for handling communication in a wireless communications network, wherein the first network node 120 comprises processing circuitry and a memory, said memory comprising instructions executable by said processing circuitry whereby said first network node 120 is operative to perform any of the methods herein.

FIG. 13 is a block diagram depicting, in two embodiments, the second network node 150 for handling communication in the wireless communications network 1 according to embodiments herein. The second network node 150 may be an IAB node, the UE 10, the first radio network node or the second radio network node 15.

The second network node 150 may comprise processing circuitry 1301, e.g. one or more processors, configured to perform the methods herein.

The second network node 150 may comprise a determining unit 1302. The second network node 150, the processing circuitry 1301, and/or the determining unit 1302 is configured to determine the version of the buffer status report (such as the version of a BSR MAC CE) to use based on the logical channel information configured at the second network node 150. Logical channel information may relate to LCGs configured at the second network node 150.

In some embodiments, versions may be defined by the number of octets used. In one embodiment, the version of the BSR may comprise a number of octets, wherein the number of octets (including the LCGs) depends on a configured LCG with a highest index. In another embodiment, the version of BSR may comprise a bitmap, wherein each bit of the bitmap is associated to a configured LCG. Thus, the number of octets of the BSR is based on the number of LCG indices configured at the second network node 150.

The second network node 150 may comprise a receiving unit 1303, e.g. a transmitter or a transceiver. The second network node 150, the processing circuitry 1301, and/or the receiving unit 1303 is configured to receive the BSR of the determined version from the first network node 120.

The second network node 150 may further comprise an operating unit 1304. The second network node 150, the processing circuitry 1301, and/or the operating unit 1304 may be configured to operate taking information of the BSR into account.

In some embodiments, the second network node 150 further comprises a memory 1305. The memory 1305 comprises one or more units to be used to store data on, such as indications, contexts, measurements, thresholds, data related to nodes, and applications to perform the methods disclosed herein when being executed, and similar. Furthermore, the second network node 150 may comprise a communication interface 1308, e.g., comprising a transmitter, a receiver and/or a transceiver.

In some embodiments, the methods according to the embodiments described herein for the second network node 150 are respectively implemented by means of e.g. a computer program product 1306 or a computer program, comprising instructions, i.e., software code portions, which, when executed on at least one processor, cause the at least one processor to carry out the actions described herein, as performed by the second network node 150. The computer program product 1306 may be stored on a computer-readable storage medium 1307, e.g. a disc, a universal serial bus (USB) stick or similar. The computer-readable storage medium 1307, having stored thereon the computer program product, may comprise the instructions which, when executed on at least one processor, cause the at least one processor to carry out the actions described herein, as performed by the second network node 150. In some embodiments, the computer-readable storage medium may be a transitory or a non-transitory computer-readable storage medium. Thus, embodiments herein may disclose a second network node 150 for handling communication in a wireless communications network, wherein the second network node 150 comprises processing circuitry and a memory, said memory comprising instructions executable by said processing circuitry whereby said second network node 150 is operative to perform any of the methods herein.

In some embodiments, a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments, the non-limiting term wireless device or user equipment (UE) is used and it refers to any type of wireless device communicating with a network node and/or with another wireless device in a cellular or mobile communication system. Examples of UE are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles, etc.

Embodiments are applicable to any radio access technology (RAT) or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Example embodiments of the techniques and apparatus described herein include, but are not limited to, the following enumerated examples:

Embodiment 1. A method performed by a first network node for handling communication in a wireless communications network. The method comprising determining a version of a buffer status report to use based on logical channel information configured at the first network node; and transmitting the BSR of the determined version to a second network node Embodiment 2. The method according to embodiment 1, wherein the logical channel information relates to LCG or LCG indices configured at the first network node.

Embodiment 3. The method according to any of the embodiments 1-2, wherein versions are defined by number of octets used.

Embodiment 4. The method according to any of the embodiments 1-3, wherein the version of the BSR comprises a number of octets wherein the number of octets indicating the LCG indices depends on a configured LCG with a highest index.

Embodiment 5. The method according to any of the embodiments 1-4, wherein, the version of BSR comprises a bitmap, wherein each bit of the bitmap is associated to a configured LCG index.

Embodiment 6. A method performed by a second network node for handling communication in a wireless communications network. The method comprising determining a version of a buffer status report to use based on logical channel information configured at the second network node; and receiving a BSR of the determined version from a first network node.

Embodiment 7. The method according to embodiment 6, wherein the logical channel information relates to LCG or LCG indices configured at the second network node.

Embodiment 8. The method according to any of the embodiments 6-7, wherein versions are defined by number of octets used.

Embodiment 9. The method according to any of the embodiments 6-8, wherein the version of the BSR comprises a number of octets wherein the number of octets indicating the LCG indices depends on a configured LCG with a highest index.

Embodiment 10. The method according to any of the embodiments 6-9, wherein, the version of BSR comprises a bitmap, wherein each bit of the bitmap is associated to a configured LCG index.

Embodiment 11. The method according to any of the embodiments 6-10, further comprising operating taking information of the BSR into account.

Embodiment 12. A first network node for handling communication in a wireless communications network. The first network node is configured to:

determine a version of a buffer status report to use based on logical channel information configured at the first network node; and transmit the BSR of the determined version to a second network node

Embodiment 13. The first network node according to embodiment 12, wherein the logical channel information relates to LCG or LCG indices configured at the first network node.

Embodiment 14. The first network node according to any of the embodiments 12-13, wherein versions are defined by number of octets used.

Embodiment 15. The first network node according to any of the embodiments 12-14, wherein the version of the BSR comprises a number of octets wherein the number of octets indicating the LCG indices depends on a configured LCG with a highest index.

Embodiment 16. The first network node according to any of the embodiments 12-15, wherein, the version of BSR comprises a bitmap, wherein each bit of the bitmap is associated to a configured LCG index.

Embodiment 17. A second network node for handling communication in a wireless communications network. The second network node is configured to:

determine a version of a buffer status report to use based on logical channel information configured at the second network node; and receive a BSR of the determined version from a first network node.

Embodiment 18. The second network node according to embodiment 17, wherein the logical channel information relates to LCG or LCG indices configured at the second network node.

Embodiment 19. The second network node according to any of the embodiments 17-18, wherein versions are defined by number of octets used.

Embodiment 20. The second network node according to any of the embodiments 17-19, wherein the version of the BSR comprises a number of octets wherein the number of octets indicating the LCG indices depends on a configured LCG with a highest index.

Embodiment 21. The second network node according to any of the embodiments 17-20, wherein, the version of BSR comprises a bitmap, wherein each bit of the bitmap is associated to a configured LCG index.

Embodiment 22. The second network node according to any of the embodiments 17-21, wherein the second network node is further configured to operate taking information of the BSR into account.

Figure 14:
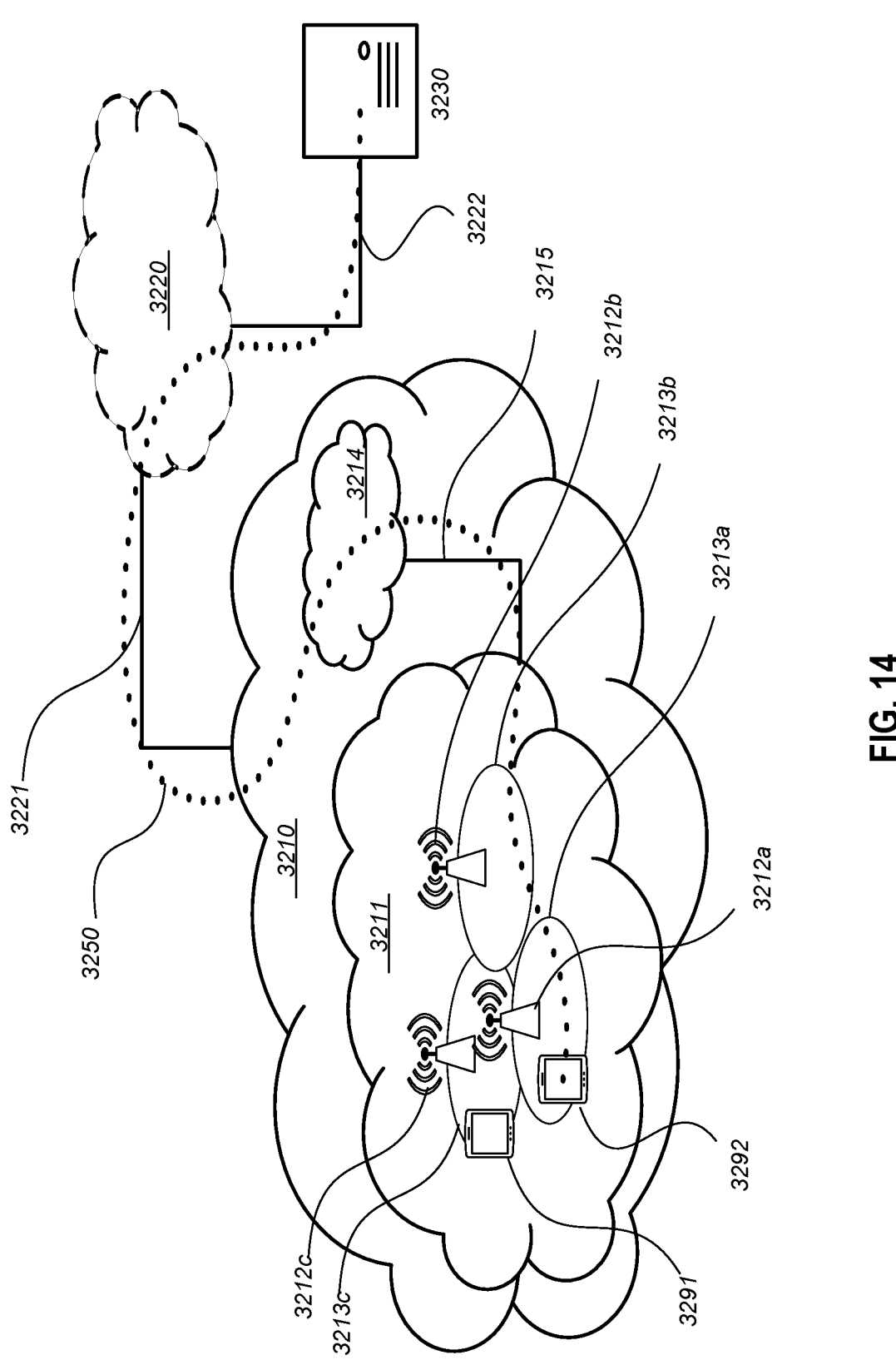
FIG. 14 illustrates a telecommunication network connected via an intermediate network to a host computer in accordance with some embodiments.

FIG. 14 shows a telecommunication network connected via an intermediate network to a host computer in accordance with some embodiments. With reference to FIG. 14, in accordance with an embodiment, a communication system includes a telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 15:
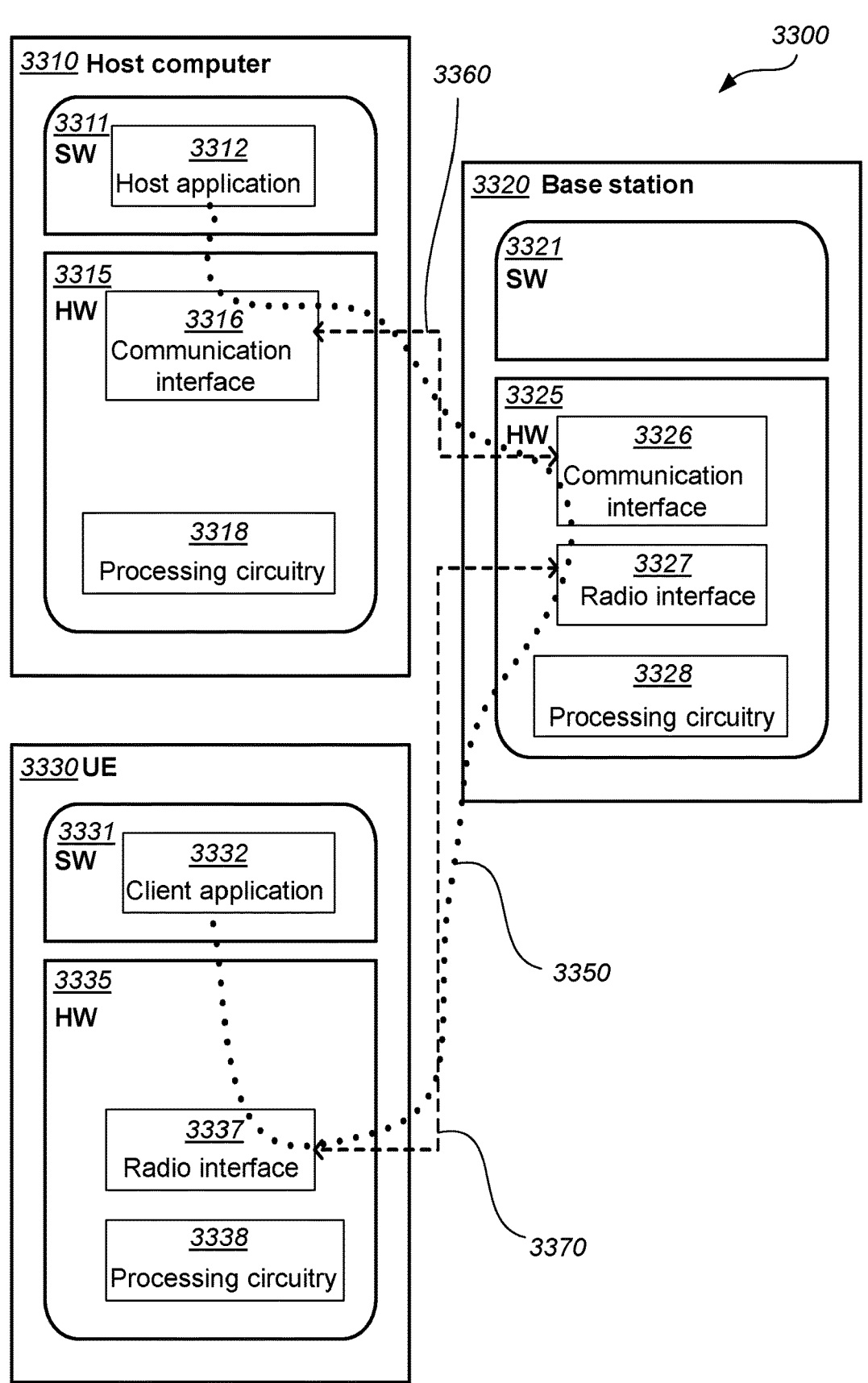
FIG. 15 illustrates a host computer communicating via a base station with a user equipment over a partially wireless connection in accordance with some embodiments.

FIG. 15 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 15 may be similar or identical to host computer 3230, one of base stations 3212a, 3212b, 3212c and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments provide an efficient signalling of BSRs. Thereby the data communication, e.g. the handling or managing setup of communication may be performed in an efficient manner.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors, etc.

FIG. 16 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figures 18, 19:
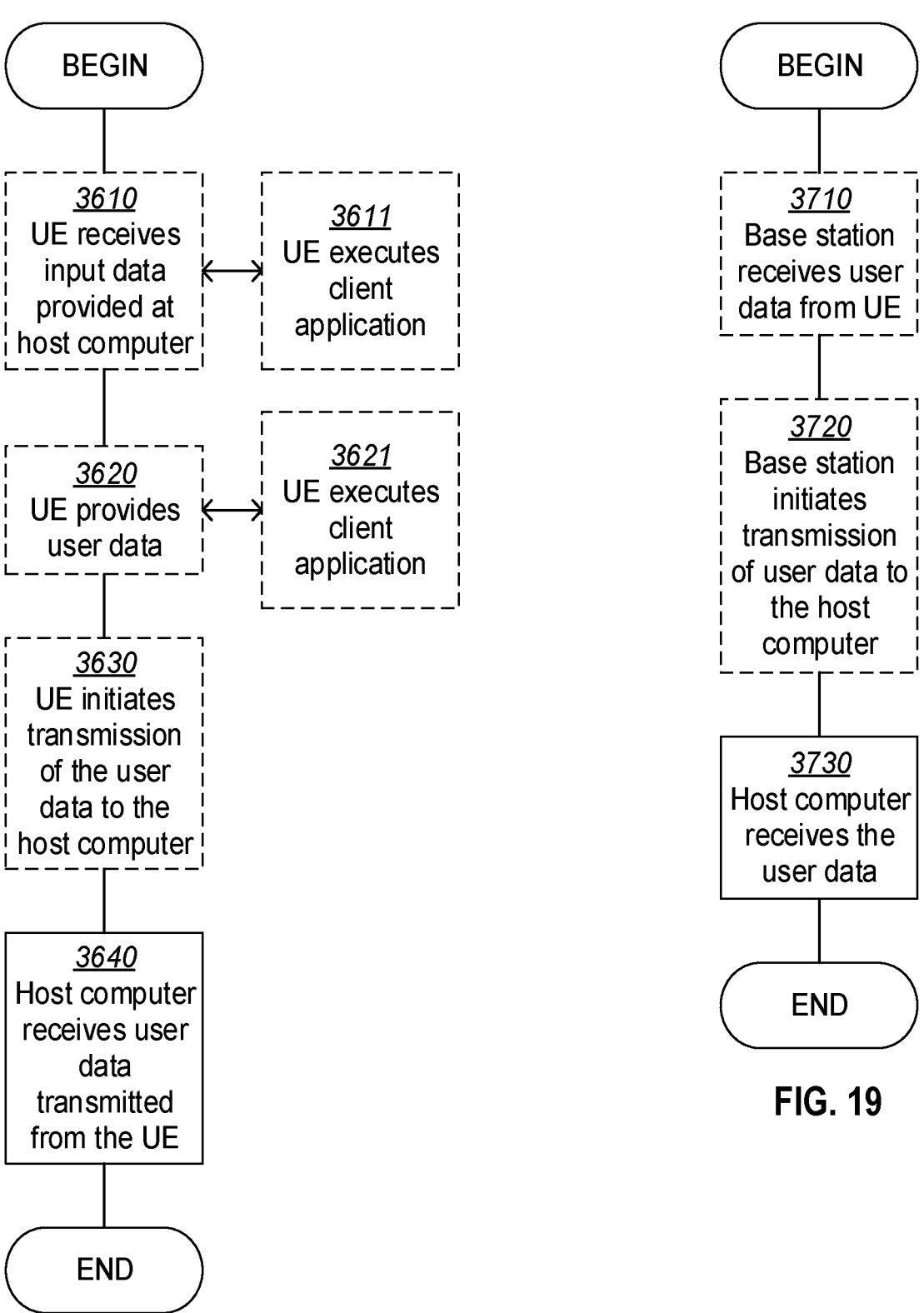
FIG. 18 illustrates methods implemented in a communication system including a host computer, a base station, and a user equipment in accordance with some embodiments.
FIG. 19 illustrates methods implemented in a communication system including a host computer, a base station, and a user equipment in accordance with some embodiments.

FIG. 18 shows methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 19 shows methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a first network node for handling communication in a wireless communications network, the method comprising:

based on logical channel information configured at the first network node, determining a version of a buffer status report to use, wherein the logical channel information:

relates to logical channel groups (LCGs) or LCG indices, configured at the first network node;

comprises a highest LCG index configured at the first network node; and/or is configured at the first radio network node via radio resource control (RRC) signaling; and transmitting the buffer status report of the determined version to a second network node.

2. The method of claim 1, wherein the version of the buffer status report to use is determined from among multiple buffer status report versions, wherein two or more of the multiple buffer status report versions each support multiple logical channel groups (LCGs).

3. The method of claim 2, wherein the two or more of the multiple buffer status report versions have different respective numbers of octets for indicating LCG indices.

4. The method of claim 2, wherein said determining comprises:

if a highest configured LCG index at the first network node is less than or equal to a first number, determining the version of the buffer status report to use to be a first version; and if a highest configured LCG index at the first network node is greater than the first number but is less than or equal to a second number, determining the version of the buffer status report to use to be a second version;

wherein the first number is greater than one;

wherein the second number is greater than the first number.

5. The method of claim 1, wherein the buffer status report of the determined version indicates, for each of multiple logical channel groups (LGCs) at the first radio network node, a total amount of data available across all logical channels of the logical channel group.

6. The method of claim 1, wherein the buffer status report is transmitted as a Medium Access Control (MAC) Control Element (CE), wherein said transmitting comprises transmitting the buffer status report of the determined version to the second network node, with the version of the buffer status report transmitted being determinable by the second network node based on logical channel information configured at the second network node via RRC signaling.

7. A method performed by a second network node for handling communication in a wireless communications network, the method comprising:

based on logical channel information configured at the second network node, determining a version of a buffer status report to use, wherein the logical channel information:

relates to logical channel groups (LCGs) or LCG indices, configured at the second network node;

comprises a highest LCG index configured at the second network node; and/or is configured at the second radio network node via radio resource control (RRC) signaling; and receiving a buffer status report of the determined version from a first network node.

8. The method of claim 7, wherein the version of the buffer status report to use is determined from among multiple buffer status report versions, wherein two or more of the multiple buffer status report versions each support multiple logical channel groups (LCGs).

9. The method of claim 8, wherein the two or more of the multiple buffer status report versions have different respective numbers of octets for indicating LCG indices.

10. The method of claim 8, wherein said determining comprises:

if a highest configured LCG index at the first network node is less than or equal to a first number, determining the version of the buffer status report to use to be a first version; and if a highest configured LCG index at the first network node is greater than the first number but is less than or equal to a second number, determining the version of the buffer status report to use to be a second version;

wherein the first number is greater than one;

wherein the second number is greater than the first number.

11. The method of claim 7, wherein the buffer status report of the determined version indicates, for each of multiple logical channel groups (LGCs) at the first radio network node, a total amount of data available across all logical channels of the logical channel group.

12. The method of claim 7, further comprising operating taking information of the buffer status report into account.

13. The method of claim 7, wherein the buffer status report is received as a Medium Access Control (MAC) Control Element (CE), and wherein the logical channel information is configured at the second network node via RRC signaling.

14. A first network node for handling communication in a wireless communications network, the first network node comprising processing circuitry configured to:

based on logical channel information configured at the first network node, determine a version of a buffer status report to use, wherein the logical channel information:

relates to logical channel groups (LCGs) or LCG indices, configured at the first network node;

comprises a highest LCG index configured at the first network node; and/or is configured at the first radio network node via radio resource control (RRC) signaling; and transmit the buffer status report of the determined version to a second network node.

15. The first network node of claim 14, wherein the version of the buffer status report to use is determined from among multiple buffer status report versions, wherein two or more of the multiple buffer status report versions each support multiple logical channel groups (LCGs).

16. The first network node of claim 15, wherein the two or more of the multiple buffer status report versions have different respective numbers of octets for indicating LCG indices.

17. The first network node of claim 15, wherein the processing circuitry is configured to:

if a highest configured LCG index at the first network node is less than or equal to a first number, determine the version of the buffer status report to use to be a first version; and if a highest configured LCG index at the first network node is greater than the first number but is less than or equal to a second number, determine the version of the buffer status report to use to be a second version;

wherein the first number is greater than one;

wherein the second number is greater than the first number.

18. The first network node of claim 14, wherein the buffer status report of the determined version indicates, for each of multiple logical channel groups (LGCs) at the first radio network node, a total amount of data available across all logical channels of the logical channel group.

19. The first network node of claim 14, wherein the processing circuitry is configured to transmit the buffer status report as a Medium Access Control (MAC) Control Element (CE), and to transmit the buffer status report of the determined version to the second network node, with the version of the buffer status report transmitted being determinable by the second network node based on logical channel information configured at the second network node via RRC signaling.

20. A second network node for handling communication in a wireless communications network, the second network node comprising processing circuitry configured to:

based on logical channel information configured at the second network node, determine a version of a buffer status report to use, wherein the logical channel information:

relates to logical channel groups (LCGs) or LCG indices, configured at the second network node;

comprises a highest LCG index configured at the second network node; and/or is configured at the second radio network node via radio resource control (RRC) signaling; and receive a buffer status report of the determined version from a first network node.

21. The second network node of claim 20, wherein the processing circuitry is configured to receive the buffer status report as a Medium Access Control (MAC) Control Element (CE), and wherein the logical channel information is configured at the second network node via RRC signaling.

* * * * *